United States Patent
Lennartsson

(10) Patent No.: US 10,326,865 B2
(45) Date of Patent: Jun. 18, 2019

(54) FILTER OR BRIDGE FOR COMMUNICATIONS BETWEEN CAN AND CAN-FD PROTOCOL MODULES

(71) Applicant: Concio Holdings LLC, Winnetka, IL (US)

(72) Inventor: Kent Åke Lennart Lennartsson, Fotskäl (SE)

(73) Assignee: Concio Holdings LLC, Winnetka, IL (US)

( * ) Notice: Subject to any disclaimer, the term of this patent is extended or adjusted under 35 U.S.C. 154(b) by 170 days.

(21) Appl. No.: 14/924,184

(22) Filed: Oct. 27, 2015

(65) Prior Publication Data
US 2016/0286010 A1 Sep. 29, 2016

Related U.S. Application Data

(60) Provisional application No. 62/137,811, filed on Mar. 24, 2015.

(51) Int. Cl.
*G06F 15/16* (2006.01)
*H04L 29/06* (2006.01)
(Continued)

(52) U.S. Cl.
CPC .......... *H04L 69/08* (2013.01); *G06F 13/4072* (2013.01); *H04L 12/40* (2013.01);
(Continued)

(58) Field of Classification Search
CPC .. G06F 13/4072; H04L 69/10; H04L 12/4135
See application file for complete search history.

(56) References Cited

U.S. PATENT DOCUMENTS 5,400,331 A  3/1995 Lucak
5,553,070 A  9/1996 Riley
(Continued)

FOREIGN PATENT DOCUMENTS

CN  1689303  10/2005
DE  102004062210  5/2006
(Continued)

OTHER PUBLICATIONS

International Search Report and Written Opinion of the International Searching Authority for PCT/US2016/021658 dated Jul. 8, 2016; 10 pages.

(Continued)

*Primary Examiner* — Kyung H Shin
(74) *Attorney, Agent, or Firm* — Fitch, Even, Tabin & Flannery LLP

(57) ABSTRACT

A filter or bridge device allows CAN-FD modules to communicate on a communication bus having classic CAN modules without generating error modules by sensing for CAN-FD frames. In response to detecting a CAN-FD frame, the filter or bridge device sends a mimic classic CAN message or frame instead of the original CAN-FD frame to classic CAN modules. An additional feature may include the filter or bridge device adding bits such as CAN overload frames onto the CAN-FD frame, mimicked classic CAN frame, or both to have the two messages end at about a same time to avoid timing errors when the modules begin to send new message frames.

36 Claims, 10 Drawing Sheets

(51) Int. Cl.
*H04L 12/40* (2006.01)
*G06F 13/40* (2006.01)
*H04L 12/413* (2006.01)
*H04L 12/46* (2006.01)

(52) U.S. Cl.
CPC ...... *H04L 12/4135* (2013.01); *H04L 12/4625* (2013.01); *H04L 69/10* (2013.01); *H04L 2012/40215* (2013.01)

(56) References Cited

U.S. PATENT DOCUMENTS

| | | | |
|---|---|---|---|
| 5,696,911 | A | 12/1997 | Fredriksson |
| 5,930,302 | A | 7/1999 | Moller |
| 6,430,164 | B1 | 8/2002 | Jones |
| 6,636,100 | B1 | 10/2003 | Shingaki |
| 7,051,143 | B2 | 5/2006 | White, III |
| 7,103,688 | B2 | 9/2006 | Strong |
| 7,243,143 | B1 | 7/2007 | Bullard |
| 7,337,316 | B1 | 2/2008 | Evans |
| 7,472,216 | B2 | 12/2008 | Fredriksson |
| 7,478,234 | B2 | 1/2009 | Fredriksson |
| 7,512,827 | B2 | 3/2009 | Steffan |
| 7,711,880 | B2 | 5/2010 | Fredriksson |
| 7,899,936 | B2 | 3/2011 | Fredriksson |
| 7,934,039 | B2 | 4/2011 | Fredriksson |
| 8,065,052 | B2 | 11/2011 | Fredriksson |
| 8,321,612 | B2 | 11/2012 | Hartwich |
| 8,737,426 | B1 | 5/2014 | Fredriksson |
| 8,897,313 | B2 | 11/2014 | Cagno et al. |
| 8,897,319 | B2 | 11/2014 | Fredriksson |
| 9,191,467 | B2 | 11/2015 | Triess |
| 9,419,737 | B2 | 8/2016 | Fredriksson |
| 9,432,488 | B2 | 8/2016 | Fredriksson |
| 9,461,937 | B2 | 10/2016 | Hartwich |
| 9,893,827 | B2 | 2/2018 | Fredriksson |
| 1,005,096 | A1 | 8/2018 | Fredriksson Lars-Berno |
| 1,021,845 | A1 | 2/2019 | Lars-Berno Fredriksson |
| 2002/0126691 | A1 | 9/2002 | Strong |
| 2002/0141438 | A1 | 10/2002 | Smith |
| 2003/0084363 | A1 | 5/2003 | Barrenscheen |
| 2004/0190531 | A1 | 9/2004 | Sibille |
| 2005/0105534 | A1 | 5/2005 | Osterling |
| 2005/0251701 | A1 | 11/2005 | Fredriksson |
| 2006/0089994 | A1 | 4/2006 | Hayes |
| 2006/0123176 | A1 | 6/2006 | Fredriksson |
| 2007/0008904 | A1 | 1/2007 | Ramesh |
| 2008/0195747 | A1 | 8/2008 | Elmaliah |
| 2009/0063909 | A1 | 3/2009 | Fredriksson |
| 2010/0272102 | A1 | 10/2010 | Kobayashi |
| 2011/0013564 | A1 | 1/2011 | Zou |
| 2011/0066297 | A1 | 3/2011 | Saberi |
| 2011/0072123 | A1 | 3/2011 | Hsu |
| 2011/0093639 | A1 | 4/2011 | Richards |
| 2012/0177035 | A1 | 7/2012 | Sharma |
| 2012/0216037 | A1 | 8/2012 | Simcoe |
| 2012/0281712 | A1 | 11/2012 | Eisele |
| 2013/0080585 | A1 | 3/2013 | Schaffner |
| 2013/0104231 | A1 | 4/2013 | Niner |
| 2013/0172046 | A1 | 7/2013 | Rofougaran |
| 2014/0071995 | A1 | 3/2014 | Hartwich |
| 2014/0129748 | A1* | 5/2014 | Muth .................. G06F 13/4072 710/106 |
| 2014/0215109 | A1 | 7/2014 | Hopfner |
| 2014/0258571 | A1 | 9/2014 | Hartwich |
| 2014/0280636 | A1 | 9/2014 | Fredriksson |
| 2014/0328357 | A1 | 11/2014 | Fredriksson |
| 2014/0330996 | A1 | 11/2014 | deHaas |
| 2014/0337549 | A1 | 11/2014 | Hartwich |
| 2015/0135271 | A1 | 5/2015 | Forest |
| 2015/0230044 | A1 | 8/2015 | Paun |
| 2016/0087737 | A1 | 3/2016 | Gach |
| 2016/0254924 | A1 | 9/2016 | Hartwich |
| 2016/0286010 | A1 | 9/2016 | Lennartsson |
| 2016/0344555 | A1 | 11/2016 | Elend |
| 2017/0126679 | A1 | 5/2017 | Fredriksson |
| 2017/0235698 | A1 | 8/2017 | Van Der Maas |
| 2018/0175958 | A1 | 6/2018 | Fredriksson et al. |

FOREIGN PATENT DOCUMENTS

| | | | |
|---|---|---|---|
| EP | 2521319 | 11/2012 | |
| EP | 2712123 | 3/2014 | |
| EP | 2712123 A1 * | 3/2014 | ............ H04L 69/10 |
| EP | 2835941 | 2/2015 | |
| EP | 3402129 | 11/2018 | |
| FR | 2990784 A1 | 11/2013 | |
| JP | 2007166423 A | 6/2007 | |
| KR | 1020140068908 | 6/2014 | |
| WO | 00062486 | 10/2000 | |
| WO | 2000062486 | 10/2000 | |
| WO | 2004019584 | 3/2004 | |
| WO | 2012150248 | 11/2012 | |
| WO | 2013000911 | 1/2013 | |
| WO | 2013000916 | 1/2013 | |
| WO | 2013020781 | 2/2013 | |
| WO | 2013030095 | 3/2013 | |
| WO | 2013144962 | 10/2013 | |
| WO | 2013164390 | 11/2013 | |

OTHER PUBLICATIONS

Adamson, T.; "Enabling Hybrid CAN and CAN FD Networks"; NXP Semiconductors Powerpoint Slides, FD Shield; Oct. 28, 2015; 24 pages.

Adamson, T.; "Hybridization of CAN and CAN FD Networks"; NXP Semiconductors; Article, ICC 2015; CAN in Automation; 4 pages.

Miller, C., and Valasek, C.; "A Survey of Remote Automotive Attack Surfaces"; article in the Washington Post, approximately Oct. 2015; http://www.washingtonpost.com/sf/business/2015/07/22/hacks-on-the-highway/; 94 pages.

Written Opinion of the International Searching Authority for PCT/US2014/027794 dated Jul. 29, 2014; 15 pages.

Written Opinion of the International Searching Authority for PCT/US2015/053277 dated Feb. 1, 2016; 8 pages.

Ziermann, T., et al.; 'CAN+: A new backward-compatible Controller Area Network (CAN) protocol with up to 16.times. higher data rates'; Hardware/Software, Co-Design, Department of Computer Science, University of Erlangen-Nuremberg; published 2009; 6 pages.

Hartwich, F., et al.; "The Configuration of the CAN Bit Timing", presented at 6th International CAN Conference; Nov. 2-4, 1999; Turin, Italy; published by CAN in Automation (CiA); Nuernberg, Germany; 10 pages.

Herrewege, V. A., et al.; 'CANAuth—A Simple, Backward Compatible Broadcast Authentication Protocol for CAN Bus'; Ku Leuven Research & Development (University), Belgium; published 2011; 7 pages.

Imran, S., et al; 'Improving information throughput in CAN networks: Implementing the dual-speed approach'; Embedded Systems Laboratory, University of Leicester, University Road, Leicester, LE1 7RH; published 2009; 6 pages.

International Search Report for PCT/US2014/027794 dated Jul. 29, 2014; 9 pages.

International Search Report for PCT/US2015/053277 dated Feb. 1, 2016; 8 pages.

Robert Bosch GMBH; "CAN With Flexible Data-Rate"; Apr. 17, 2012; www.bosch-semiconductors.de/media/pdf_1/canliteratur/can_fd.pdf; 34 pages.

Robert Bosch GMBH; Web Pages 'CAN With Flexible Data-Rate'; Aug. 2011; http://www.bosch-semiconductors.de/media/pdf 1canliteratur/can_fd.pdf; 14 pages.

Swedish Standards Institute; SS-ISO 11898-1; 'Road Vehicles-Controller Area Network (CAN), Part 1: Data Link Layer and Physical Signalling'; Dated Dec. 5, 2003; Published Jan. 2004; 51 pages.

(56) References Cited

OTHER PUBLICATIONS

Swedish Standards Institute; SS-ISO 11898-1; 'Road Vehicles-Controller Area Network (CAN), Part 1: Data Link Layer and Physical Signalling'; Dated Dec. 5, 2003; Published Jan. 2004; Updated 2006; 51 pages.
Supplementary European Search Report for PCT/US2015/032384 dated Dec. 8, 2017; 8 pages.
Hartwich, F.; "CAN with Flexible Data-Rate"; Proceedings of the 13th International CAN Conference, Mar. 14, 2012; XP055133740; retrieved from the Internet: http://www.can-cia.org/fileadmin/cia/files/icc/13/hartwich.pdf; published in CAN in Automation; 9 pages.
Hartwich, F.; "CAN with Flexible Data-Rate" newsletter 2 12 final-CAN in Automation; retrieved from Internet Mar. 5, 2018; www.can-newsletter.org/uploads/media/raw/d6554699cf2144326280f/555b97ea.pdf; Robert Bosch GmbH, Reutlingen, Germany.; 10 pages.
European Search Report for EP 18171305.8-1216 dated Sep. 26, 2018; 8 pages.
Hartwig, F., et al.; "The Configuration of the CAN Bit Timing" (Robert Bosch GmbH, Abt. K8/EIS), presented at 6th International CAN Conference Nov. 2-4, Turin (Italy), published by CAN in Automation (CiA), Nürnberg Germany.
International Search Report for PCT/US2016/060056 dated Feb. 13, 2017; 3 pages.
Written Opinion for PCT/US2016/060056 dated Feb. 13, 2017; 7 pages.

\* cited by examiner

Figure 6

Figure 7

FILTER OR BRIDGE FOR COMMUNICATIONS BETWEEN CAN AND CAN-FD PROTOCOL MODULES

RELATED APPLICATION(S)

This application claims the benefit of U.S. Patent Application No. 62/137,811 filed Mar. 24, 2015, the contents of which are incorporated by reference in their entirety herein.

TECHNICAL FIELD

This invention relates generally to communication protocols and more specifically to managing communications between modules using a classic CAN protocol and modules using a CAN-FD protocol.

BACKGROUND

The Controller Area Network ("CAN") communications protocol has been known for 25 years (referred to herein as "Classical CAN" or "CAN-C"). The CAN-C protocol is used for communication among several communication modules or micro-controller units ("MCUs") on a common bus. In 2012, a new communication protocol based on CAN was proposed having up to 64 byte where data can be sent with a higher bit-rate as compared to CAN-C. This new CAN-protocol was named CAN-Flexible Datarate ("CAN-FD"). A CAN-FD controller can handle both CAN-FD frames and CAN-C frames concurrently on the same CAN-bus. The problem is that previous produced CAN-controllers cannot handle the CAN-FD format. If a CAN-C controller receives a CAN-FD protocol message, the CAN-C controller generally will output an unrecoverable Error-condition.

This compatibility problem is significant because there are several hundred different products with using CAN-C made pursuant to the previous version of the International Standards Organization ("ISO") 11898-1. Interest in adopting CAN-FD as a higher speed protocol is discouraged because such modules cannot be used on a bus having a module that can only communicate using CAN-C.

Although theoretically one can convert an ECU (Electronic Control Unit) such as the one illustrated in FIG. 2 from Classical-CAN to CAN-FD by replacing the integrated Classical CAN-controller with a CAN-controller with CAN-FD functionality, but such a conversion involves an investment and time. First, it is necessary to design a new MCU where the Classical-CAN controller is replaced by the CAN-FD controller. Then it is necessary to make new masks defining how such device will be produced. After the device is produced will it be necessary to verify and validate that everything is working as expected. This process will take at least six months before there are any new devices to test in the ECU. When you have the ECU with the new MCU including the CAN-FD controller, it will be necessary to do some changes in the software to support the CAN-FD controller. Even if those changes are relatively small, it will be necessary to evaluate that nothing else changed. If the devices have a safety related task, it will be necessary to retest the complete unit. Such test will take several months up to a year assuming that the first MCU samples have no bugs. In most cases will there be some parts that did not come out 100% correct, and it will be necessary to make a redesign of the MCU.

One attempt to solve this problem includes inserting a filter between CAN-FD portions of the bus and any CAN-C modules that intercept CAN-FD communications before they reach CAN-C modules. This solution, however, is not elegant because a CAN-FD communication can only be identified by reading a particular bit (FDF bit) of the communication, which according to the CAN-C and CAN-FD protocols is several bits into the message. In CAN-C the FDF bit is always logic zero and in CAN-FD the CAN-FD bit is logic one. Thus, this approach will result in either generation of an error message when the CAN-C controller sees that the message it was receiving is cut off by the filter or a delay where the filter holds the message until receipt of the FDF bit. In the second situation, however, holding back the message can interfere with communications arbitrations that coordinate how the modules communicate amongst themselves.

In the first situation, it could be possible to prevent this Error-frame from coming out on the CAN-bus, but it will still cause confusion for diagnostics to distinguish those artificial local Error-Frames from real Errors. If there are too many CAN-FD frames on the bus, there is a risk that those Classical-CAN units will go Error-passive, which will change the behavior of those modules in the system.

Even if one were to accept that each CAN-FD frame will result in a local Error Frame, there remains an even bigger problem. The CAN protocol is designed to make it possible to start sending the next CAN frame directly after the previous frame has ended. This makes the CAN-protocol effective, but this also demands that all CAN devices must complete their CAN-frames simultaneously, including the Error Frames, to begin the next CAN frame in the next succeeding bit on the bus. The probability that the local Error-frame will end at the same instance in time as the CAN-FD frame on the CAN-bus is very low. If a second CAN-message will start directly after the Error-frame for the local node or after the CAN-FD frame on the bus, there will an unrecoverable condition with the only solution being to place an Error-frame at the same time both locally and on the CAN-bus. This will force all units to restart the communication with a great probability that the same problem will occur a second time until some units will go bus-off and leave the communication.

SUMMARY

Use of a bridge or filter device as described herein allows for communication on a bus having both CAN-C and CAN-FD modules without generation of error flags or delays that can effect communication arbitration. The device can be placed between a CAN-C controller and CAN-FD modules. The device detects that the CAN frame communication from a CAN-FD modules is sent according to the CAN-FD protocol and converts or mimics those frames into frames according to the CAN-C protocol and in a manner to avoid triggering an error flag in the receiving CAN-C controller. The CAN-C controller accepts this mimic frame without causing any Error condition.

One drawback to this solution is that the CAN-FD frame and the mimicked CAN-C frame will very likely not end at about the same time. This can become a problem because CAN modules are allowed to start sending a new frame immediately after the previous frame ends. Thus, if the CAN-FD frame and the mimicked CAN-C frame do not end at the same time, either the CAN-C module or the CAN-FD module may start sending a new frame before the other module is prepared for reception thereby creating another error situation. To solve this issue, extra bits are sent immediately following the CAN-FD frame on the CAN-FD portion of the communication network or immediately following the mimicked CAN-C frame on the CAN-C side of the filter or bridge device so that the messages end at about the same time. By one approach, the overload frames as defined in the CAN-C protocol are used as the extra bits to secure that the next CAN frame on the communication network will start according to the CAN-rules. So configured, the addition of a bridge or filter device as described will allow CAN-FD modules to be used on a communication network having older CAN-C modules with reduced error occurrences. These and other benefits may become clearer upon making a thorough review and study of the following detailed description.

BRIEF DESCRIPTION OF THE DRAWINGS

The above needs are at least partially met through provision of the filter or bridge for communications between CAN and CAN-FD protocol modules described in the following detailed description, particularly when studied in conjunction with the drawings, wherein:

FIG. 6 comprises illustration of example communication frames according to a CAN-FD protocol without bit rate switch, a CAN-C protocol, and a CAN-FD protocol with bit rate switch;

FIG. 7 comprises illustration of example communication frames as configured in accordance with various embodiments of the invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. Elements labeled with the same last two digits of FIGS. 2-5 (for example, 204, 304, 404, and 504) are identical except where noted. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
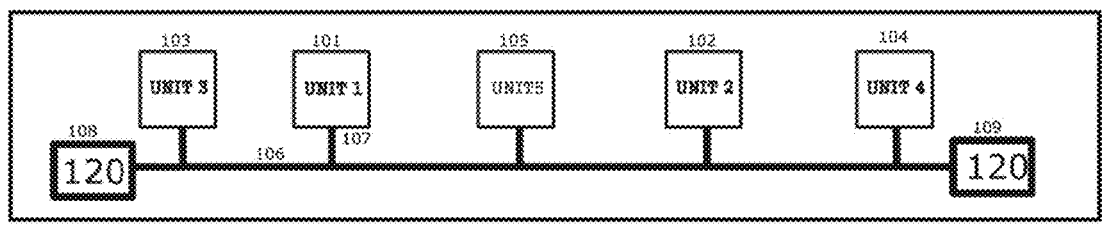
FIG. 1 comprises a block diagram of an example communication network as configured in accordance with various embodiments of the invention.

Referring now to the drawings, and in particular to FIG. 1, an illustrative communication network that is compatible with many of these teachings will now be presented. The 5 ECUs are labeled 101-105. The CAN-bus 106 is normally made up by two twisted wires. The two twisted pair is connected to the ECUs via a drop-line 107 to ECU 101. The drop line 107 is a twisted pair with the same type as in the CAN-bus 106. To have a real working system, all units need some power supply, and all CAN-drivers in the ECU need to have the same ground potential within certain range, typically within +/−7 volt up to +/−40 Volt. All ECUs do have some function in a control system and will have some other interfaces to sensor and different types of actuators, but those have no impact on the invention and are removed to simplify the figure.

The CAN-bus 106 wires are typically labeled CANH (CAN-High) and CANL (CAN-Low). In a typical CAN-system, the voltage on both CANH and CANL is at about 2.5 Volt, and the voltage is the same on both CANH and CANL when no frames are sent. There are two ending resistors 108 and 109 typically having a value of 120 Ohm. The ending resistor has two functions. The first is to define the passive recessive level of the CAN-bus where the resistor will demand a certain current from CANH to CANL over the resistor to get the voltage at CANH more than typically 0.5 Volt higher than CANL. In this text is only the CAN-bus with a twisted pair described, because that is the most common solution when you have higher bitrates. The subject matter described herein, however, will work for any communication media where it is possible to define a recessive level that any unit 101 to 105 can force to dominant level. There are solutions where recessive level is no light and where dominant level is light. Also a radio transmission can be used where no carrier wave is recessive and a carrier wave detected is dominant. There are also CAN-drivers that use only one wire for the signal relative ground and the power-supply level.

The CAN protocol operates over a communication bus, meaning that all CAN devices are connected to a common communication line. This is shown in FIG. 1 where all CAN devices 101-105 are connected to a common communication line, the CAN bus 106. CAN is based on the CSMA/CR (Carrier Sense Multiple Access/Collision Resolution), which means that any module can start sending if no one else has already begun broadcasting. There is a certain risk that one or more devices start to transmit simultaneously. If this occurs there will be a collision in the CAN-ID part of the frame. In CAN, no unit will use the same CAN-ID, and the CAN-ID is also a priority level. If the CAN-ID portions of competing messages collide, the unit with the highest priority wins the CAN-bus and send the rest of its CAN-frame without any competition. All units with lower priority will retry to win the CAN-bus as soon as the previous CAN-frame has ended, which ends after the IM3-bit. This competition in the CAN-ID will continue until there is only one unit left with CAN-frames to send. When this last CAN-frame is sent, the CAN-bus turns into the Idle-phase until some units have a CAN-frame to send. If the CAN-bus is free, this unit will start sending this CAN-frame without any delay. Still there is a risk that a second unit happens to start a second frame almost at the same time. Again this collision will be solved by the arbitration in the CAN-ID, and CAN-frame with the highest priority will win the bus and be the first to send this CAN frame.

Figure 2:
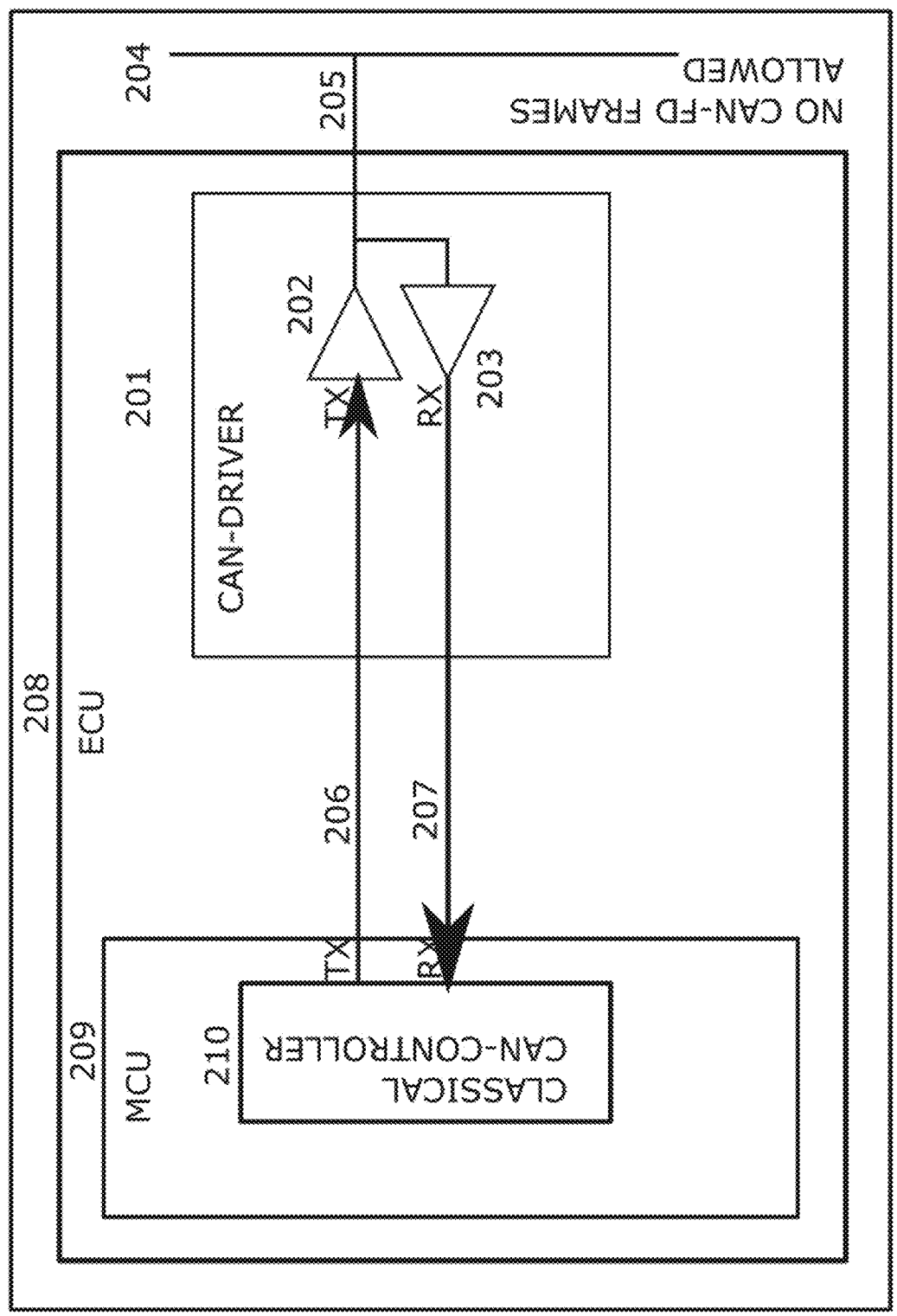
FIG. 2 comprises a block diagram of an example communication module connected to a bus.

FIG. 2 illustrates a typical arrangement for an ECU 101-105 with a classical CAN-controller. Non-relevant aspects of such a device are omitted for clarity such as power-supply, digital and analog IOs, filters, and connectors. The external CAN-bus 204 has a drop line 205 to the CAN-driver 201. This CAN-driver 201 in this example is an integrated circuit typically molded into SO8 device with 8 pins. Two of those eight pins are connected to the receive signals from CANH and CANL from the twisted pair drop line 205. The CAN-driver 201 performs a number of different electrical functions including keeping CANH and CANL at 2.5 Volt. This control voltage has high output impedance so it is easy for other devices to change the level from 2.5 Volt to other levels with a relative small current. The circuitry 203 is the input part of the CAN-driver that will compare the voltage level of CANH relative to CANL. The state where CANH is less than 0.5 Volt higher than CANL is defined as recessive bus represented on the reception (RX)-pin 207 with a high voltage, typically 5 or 3.3 Volt, and this level is defined as logical 1. This digital signal is connected to the CAN-controller 210, which in this case is a function integrated into the MCU (Micro Controller Unit). There are several hundred different MCUs with CAN controllers available on the market with different size in memory like SRAM and Flash and with different type of IOs to control different types of actuators and read different types of sensors. In most cases an MCU with integrated CAN-controller is used, but in some cases is it not possible to find an MCU with all functionality needed in combination with an integrated CAN-controller. In such cases, an external CAN-controller, like SJA1000 or a MCP2515, can be used, but the location of the CAN-controller relative to the MCU or any other logic makes no difference for application of the described subject matter as long as the device connected to the described filter or bridge generally complies with the rules defined by the CAN-protocol.

The CAN-controller will scan the level of the RX-signal 207, and if this signal will get a low voltage level, logical 0, the CAN-controller assumes that a CAN-frame started transmission on the CAN-bus. If the software running in the MCU 209 requests a transfer of a stored CAN-message in the CAN-controller, the CAN-controller sends out the CAN-frame on the transmission (TX)-line 206 to the CAN-driver 201. If the signal 206 has a high voltage level, indicating logical level 1, the circuit 202 stays inactive, and the CANH will have the same voltage level as CANL. If the CAN-controller makes the signal low, the circuit 202 in the CAN-driver forces a current out on the signal CANH and pulls a current from CANL that will force CANH to a higher voltage level and CANL to a lower voltage level. When CANH becomes more than 0.5 above CANL, the signal 207 becomes logical 0, and this feedback of the signal 206 can be used by the CAN-controller to secure that the bus has the correct level by the circuit 202. In the example of FIG. 2, the controller 210 is a Classical-CAN controller. Thus, reception of a CAN-FD frame by the CAN-driver 201 will cause an error in the Classical-CAN controller 210 because the CAN-FD frame violates the Classical-CAN format.

Figure 3:
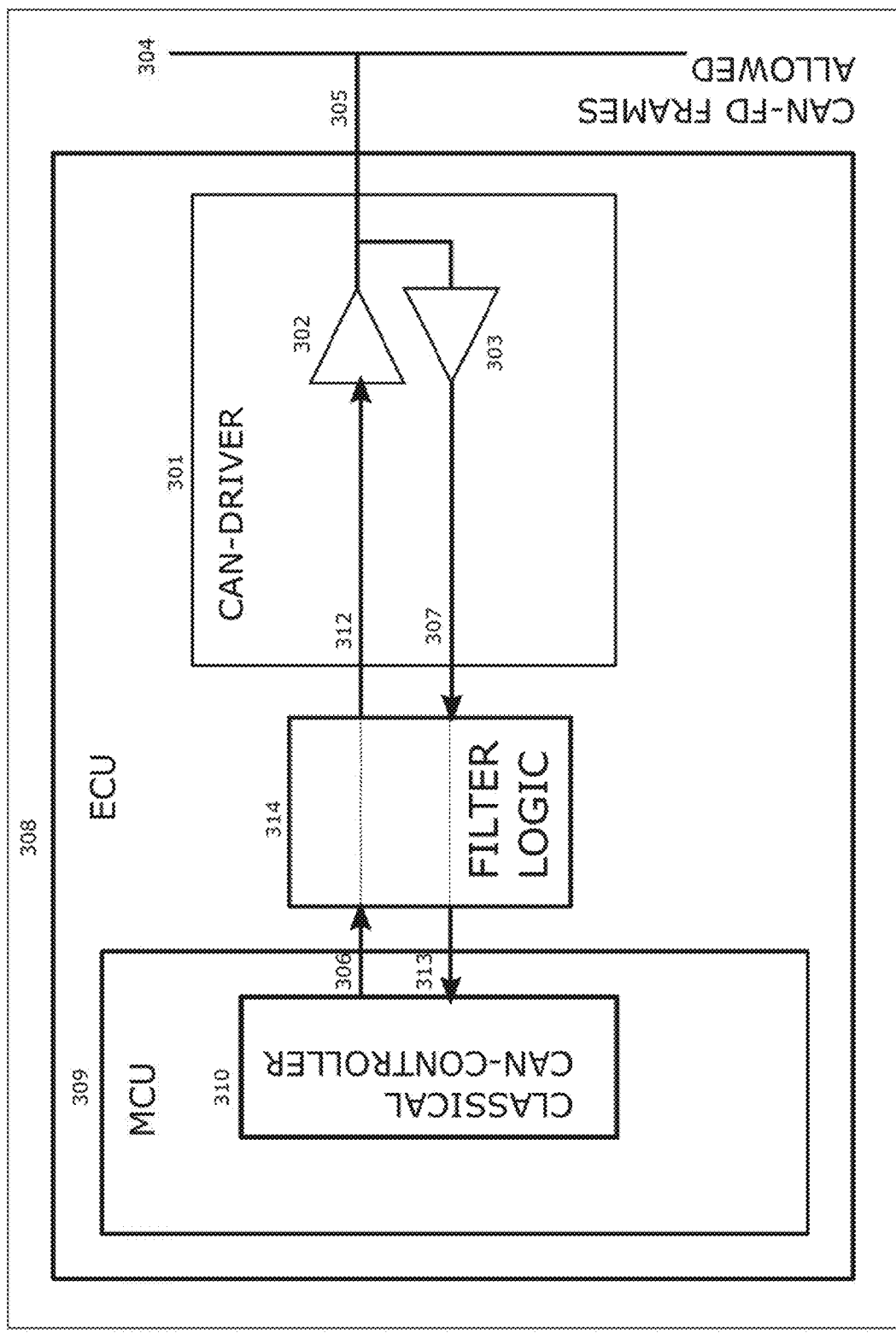
FIG. 3 comprises a block diagram of an example communication module connected to a bus as configured in accordance with various embodiments of the invention.

FIG. 3 illustrates the ECU as described in FIG. 2 but with a filter 314 added to the unit. Here, a communication device apparatus 308 communicates with other devices over a control network including the bus 304. The apparatus 308 includes a communication port, here illustrated at the CAN-driver 301, which connects to a first communication path 305 including at least one communication device compliant with CAN-FD protocol and to a second communication path 306 and 313 including at least one communication device (here, the classical CAN-controller 310) compatible with classic CAN protocol but incompatible with the CAN-FD protocol. A processing device is operatively connected to control receiving and sending communications between the first communication path 305 and the second communication path 306 and 313. The filter 314, which can be implemented as part of known processing devices/circuits within CAN based communication units, is located between the CAN-driver 301, which operates similarly to the CAN-driver 201, and the CAN-controller 310. The signal 307 indicating the CAN-bus level recessive or dominant will not go directly to the CAN-controller, but to the filter 314. Most of the time the filter does nothing other than receive a message from the first communication path 305 and retransmit it on the second communication path 313. In other words, the signal level will be copied to the line 313 with as little delay as possible, typically 3-30 nano seconds. The output 306 from the CAN-controller is also connected to the filter 314. This signal is copied to the signal line 312 with as little delay as possible, typically 3-30 nano seconds. Under normal conditions the filter 314 does nothing between the CAN-driver 301 and the CAN-controller 310, except causing a slight delay in the two signals. The filter 314 monitors bits of the message to determine status of an FDF bit of the message and changes behavior if a CAN-frame received at the signal line 307 has a recessive FDF-bit. In that case, the filter 314 switches into behavior as is described in FIG. 4.

Figure 4:
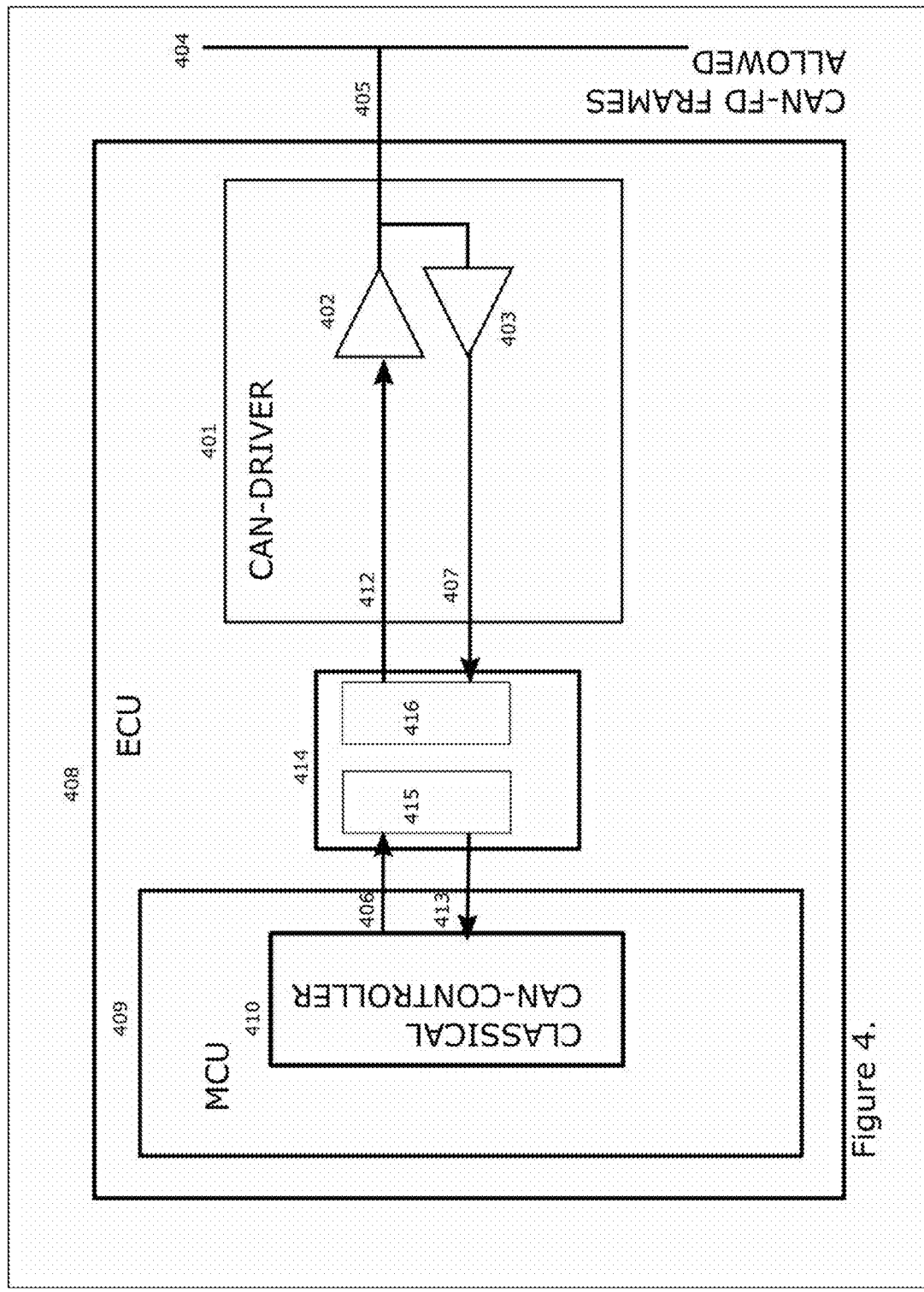
FIG. 4 comprises a block diagram of an example communication module connected to a bus as configured in accordance with various embodiments of the invention.

FIG. 4 illustrates the filter's 414 function during receipt of CAN-FD frames on the CAN-bus. In short, in response to determining that the FDF bit indicates a transition to a CAN-FD format, the filter 414 transmits replacement bits on the second communication path 413 to mimic a classic CAN message instead of retransmitting CAN-FD bits from the message following the FDF bit. The replacement bits that mimic the classic CAN message are configured to avoid causing a communication device on the second communication path 413 to generate an error flag. More specifically, when a CAN-FD frame is detected on the CAN-bus, the filter 414 switches from a short signal delay to two separate control blocks. One block 416 exhibits CAN-FD functionality involved with the bits coming in from the CAN-bus 405 that will describe the CAN-FD frame sent by some unit with CAN-FD capability. The other block 415 processes the bit flow between the filter 414 and the Classical CAN controller 410 in the ECU 409. The CAN-controller 410 has received all bits from SOF up to and including the FDF-bit before the filter 414 detects that this is a CAN-FD frame. Even if the two blocks 415 and 416 are not active in the communication until the recessive FDF-bit is received, in this example, they still have one task to do between the SOF-bit and the FDF-bit. Block 415 receives all the bits and calculates the CRC-15 checksum used to make a proper mimic CAN-C frame. A similar task is done by the block 416, calculating CRC-17 and CRC-21 that is necessary to check if the received CAN-FD frame is according to the CAN-FD rules. Block 416 counts the stuff-bits starting from the SOF-bit. Block 416 will behave identical to an ordinary CAN-FD controller and follow all CAN-FD rules.

The Classical CAN-controller will not accept an interruption in a CAN-frame without indicating this as an Error condition. To solve this problem, block 415 mimics a Classical CAN-frame from the FDF-bit up to the end of the frame. In one approach, the mimicked CAN-frame sets the FDF-bit to zero followed by a further mimicked frame. In another approach, the FDF-bit can be passed through unchanged and start mimicking the bits after the FDF-bit if FDF-bit is received as recessive. If the CAN-controller 410 for some reason detects an error-condition, the error will be ignored because this is a local error involving a CAN-frame not valid for this unit and there is no reason to make that into a global error that would destroy the currently transmitted CAN-FD frame or cause other disruption on the global CAN-bus. Alternatively, the internal or local error can be passed from the CAN controller 410 through the filter 414 and to the CAN bus 404. In a further option, the block 415 performs error-checking for the complete message as described in the CAN-standard. If an error is detected, the block 415 sends an error-frame to the side of the filter 414 from which the error occurs and concurrently send an error-frame to the other side of the filter 414 to make sure that all units connected to the control network have consistent error counters. The probability of an Error between the Filter and the CAN-controller in this implementation should be very low because this will be a very short signal path routed on a PCB (Printed Circuit Board) covered by a protective housing.

The logic block 416 handling the CAN-bus signal is little more complicated. The logic 416 is almost a complete CAN-FD controller except it will not store any CAN-ID or any data bytes. It will make all error-checking and send an Error-frame according to the CAN-FD protocol, and if the frame is correct will block 416 places an ACK-bit on the bus, indicating that this unit has received this CAN-FD frame correctly. If an Error condition is detected in the CAN-FD frame, the block 416 places an Error-frame on the CAN-bus 404 and forces the logic 415 to send an Error-frame at the same time to the CAN-controller 410. This secures that all units have the same view of the CAN-bus quality, and all Error counters will be consistent.

The function so far will secure that CAN-controller 410 will receive a mimic CAN-frame that follows the CAN-protocol by the logic block 415. At the same time, the logic block 416 secures that the CAN-ED on the CAN-bus will be processed in the unit as though received by a real CAN-FD controller except that the message is not saved in the logic. This approach secures that both those messages are processed according to the CAN-protocol. There is still one problem to be solved to secure a proper behavior according to the CAN-protocol. The solution described so far will work without any problem if the bus-load is low and if there will be a short period where the CAN-bus is idle before the next CAN-frame is sent by any units connected to the CAN-bus.

The CAN-protocol, however, does not demand any idle sections between two CAN-frames on the bus. The rule is that if a unit has a message to transmit it must not start such transmission until the bit after the IM3-bit. This may cause a problem because most probably either the CAN-FD frame or the mimic CAN-C frame will reach the IM3-bit before the other side reaches its IM3-bit. This problem is visualized in FIGS. 6 and 7. To solve this problem additional logic is provided in blocks 415 and 416 to synchronize the communication paths 407/412 and 406/413 on either side of the filter 414. The logic arranges the IM3-bits of the CAN-FD frame and mimicked CAN-C frame to be present at about the same time on both sides of the filter 414 to avoid errors with the start of the next CAN frame.

In one approach, the CAN-protocol defines Overload-frames that can be used as the extra bits to delay the end of the CAN-frame. An Overload-frame in CAN is normally an Overload-flag with seven dominant bits followed by an Overload-delimiter. This standard Overload-frame will delay the IM3-bit, but it will not change the location of the IM3-bit on one side relative to the IM3-bit on the other side. The CAN-protocol allows use Overload-flags with a length longer than the normal seven dominant bits although this is not explicit in the protocol definition. Even if the expected length of the Overload flag is only seven dominant bits, all units will accept that the Overload flag is up to 14 dominant bits. By sending an Overload flag with seven dominant bits on one side and between eight and 14 dominant bits on the other side, the IM3-bit can be moved between one to seven bits on one side relative to other of the filter 414. After the Overload-frames situate the IM3-bits on both sides of the filter closely enough to avoid errors in starting a next CAN frame, the filter 414 switches back to the transparent mode as described with reference to FIG. 3.

In FIG. 4 the filter 414 logic is located between the CAN-driver 401 and the MCU 409/CAN-controller 410. Implementation of this arrangement to update old CAN-C controllers to work with CAN-FD modules may be difficult where the filter 414 is located in a FPGA (Field Programmable Gate Array) circuit located in the PCB between the CAN-driver and the MCU. The difficulty arises because a new PCB must be designed and tested to confirm operation having the same function as before implementation of the filter.

Figure 5:
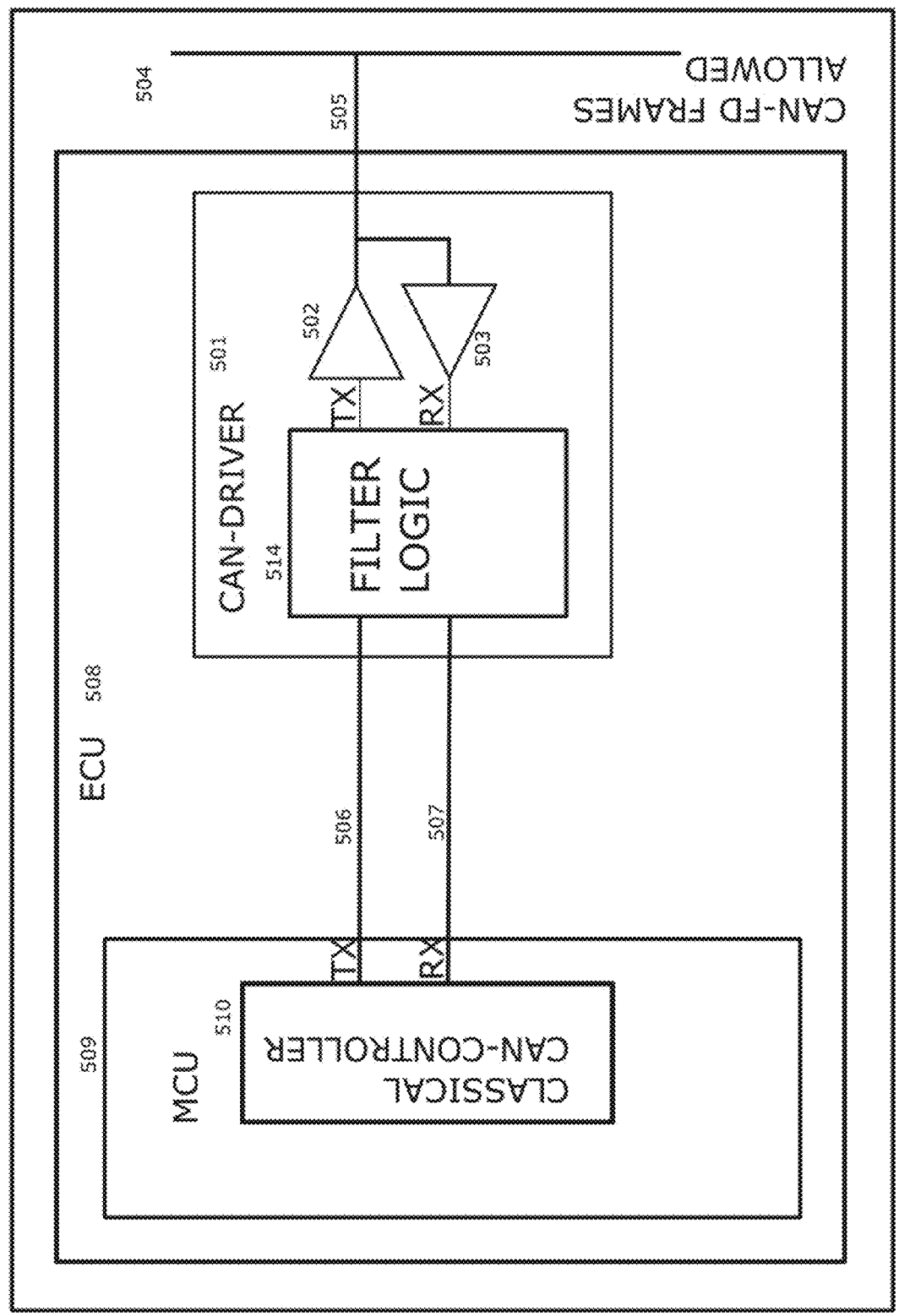
FIG. 5 comprises a block diagram of an example communication module having filter logic incorporated into a CAN-driver connected to a bus as configured in accordance with various embodiments of the invention.
Figure 10:
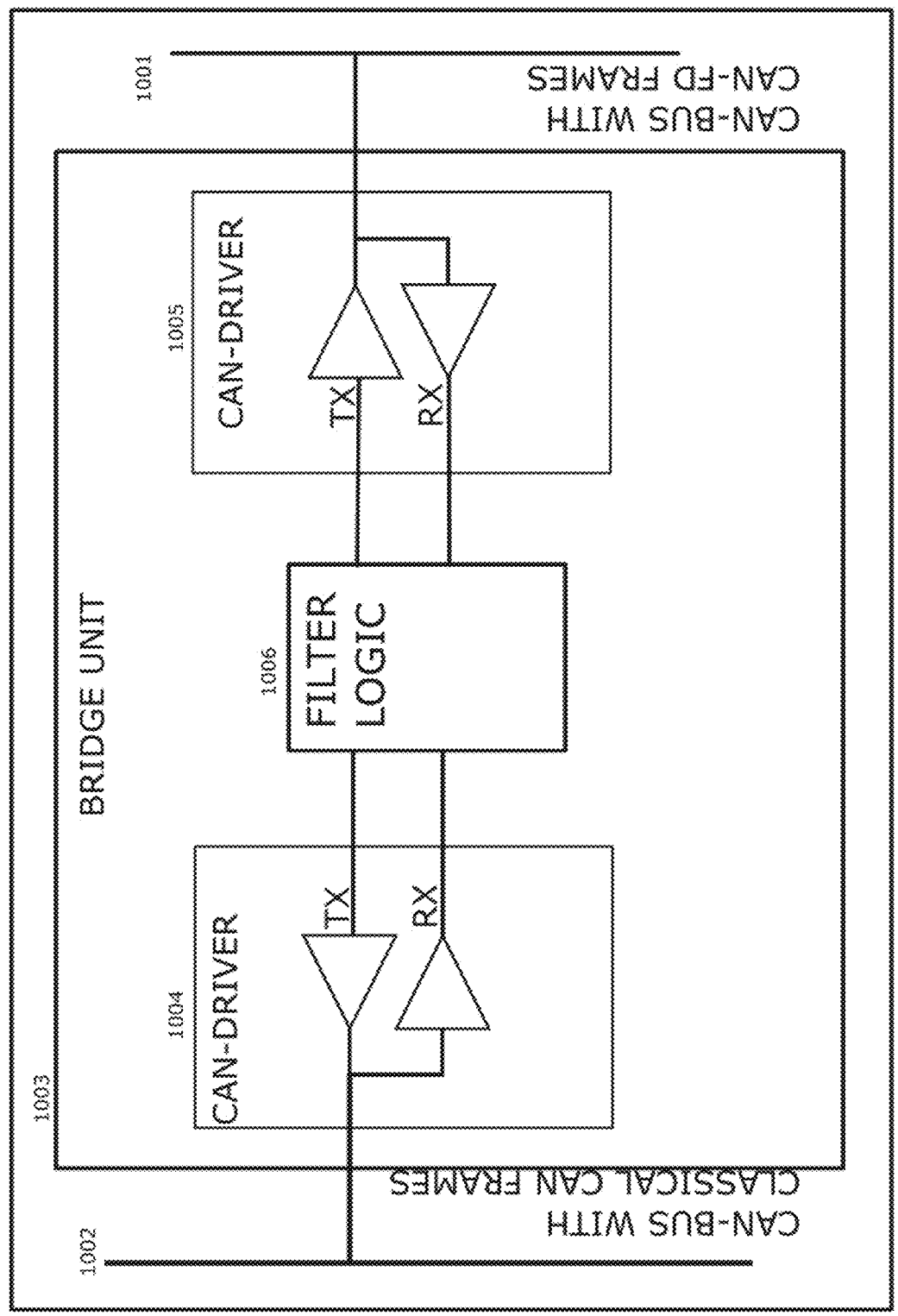
FIG. 10 comprises a block diagram of an example bridge communication module as configured in accordance with various embodiments of the invention.

In another approach, FIG. 5 illustrates integrating the filter logic 514 into the CAN-driver device 501. If the filter logic 514 is integrated combined with CAN-driver 501 into the same SO8 frame, the updating effort for allowing an old CAN-C controller to be on a bus with CAN-FD modules is reduced because the filter logic 514 is then incorporated into a chip that can readily replace the previous CAN-driver chip on the ECU's 408 board. In the context of this description, the word "filter" indicates implementation of the described features into an ECU either between the CAN-driver and CAN-C controller such as that illustrated in FIG. 4 or into the CAN-driver itself as illustrated in FIG. 5 (although other ways of incorporated this logic into the ECU may be possible and be considered a filter). In any event, the filter has a CAN-C controller on a communication path on one side and a communication path with one or more CAN-FD modules on the other side. The word "bridge" indicates implementation of the same logic as that described with respect to a "filter" into a device on the communication bus that splits the bus between one communication path having one or more CAN-FD modules and another communication path having one or more CAN-C modules as illustrated in FIG. 10.

Figure 6:
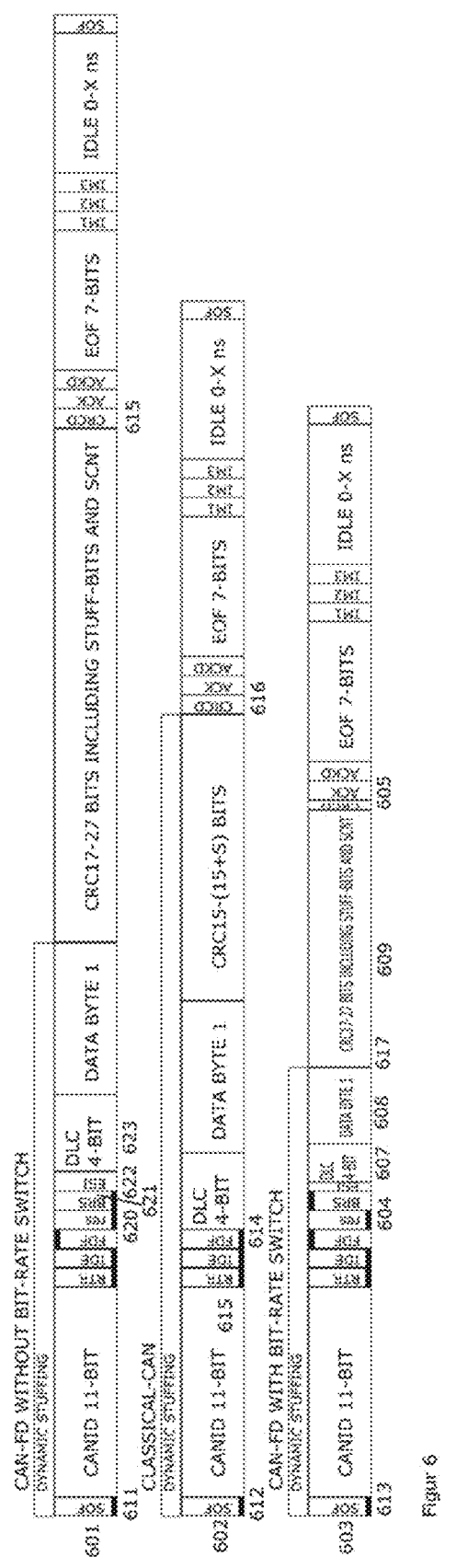

FIG. 6 illustrates the similarity and differences among a CAN-C frame 602 with one byte of data and two CAN-FD frame formats 601 and 603, each also with one byte of data. The CAN-C frame 602 shows the layout of bits creating a CAN-C frame with one byte in accordance with the CAN protocol. Above this CAN-C frame 602 is a CAN-FD frame 601 sending one byte of data without changing the transmission bit-rate. The other CAN-FD frame 603 is identical to CAN-FD frame 601 except for use of a higher bit-rate in the part of the message between the BRS (Bit Rate Switch) bit 604 and the CRCD (Cyclic Redundancy Check Delimiter) bit 605. Logic states for certain bits of the illustrated frames that are set by definition of the respective protocols are illustrated by the thicker lines on top of or at the bottom of those respective bits such as the SOF (Start of Frame) bit, RTR (Remote Transmission Request) bit, IDE (Identifier Extension) bit, FDF bit, BRS bit, and the like. By using a higher bit-rate in the bits holding the segments DLC (Data Length Code) 607, DATA 608, and CRC (Cyclic Redundancy Check) 609 less time is used to transfer those bits over the communication link thereby shortening the CAN-ED frame. Accordingly, all three CAN-frames could send exactly the same information, one byte of data, but the protocol bits surrounding the data byte are different in CAN-FD frames 601 and 603 as compared to CAN-C frame 602 resulting in different overall lengths in the respective frames.

As described above, the first task is to ensure that the CAN-C controller does not provide fault indication because there is a CAN-FD frame on the CAN bus. A CAN frame always starts with a dominant bit SOF 611 whether it is a CAN-FD or a CAN-C frame. The thick line at the bottom of the SOF bits 611, 612 and 613 illustrates their respective dominant values within the CAN-C and CAN-FD protocols. The bits between the SOF-bit 612 and the FDF-bit 614 are interpreted in exactly the same way in CAN-FD and CAN-C. In the example of FIG. 6, the respective CAN-frames 601, 602, and 603 have similar 11-bit CAN-ID (element 615 in CAN-C frame 602), which is the so called Standard format. It is also possible to use Extended CAN-frames, which hold 29 ID-bits instead of the 11-bits used in Standard frames. Although the Extended frame contains more bits between the SOF-bit and FDF-bit, this format is also common between CAN-FD and CAN-C up to the FDF-bit. Accordingly, the described solution can apply to CAN-C and CAN-FD frames in all their variants regardless of their format, e.g., Extended or Standard.

If the FDF-bit 614 is dominant as illustrated in CAN-C frame 602, the CAN-frame will be interpreted as a CAN-C frame. In this case, referring briefly to FIG. 4, the filter 414 only needs to continue copying bits from the CAN bus 404 to the RX-signal line 413 to the CAN-C controller 410 while copying the TX signal line 406 back to the CAN bus 404. The TX signal on line 406 is normally recessive, which is why it does not affect the CAN bus 404, but if the CAN-C controller 410 detects a fault, it needs to be able, according to the CAN protocol, to send out an "Error Frame." Thus, it is preferable that the TX signal on line 406 is copied as quickly as possible out to the CAN-bus 404. In the event that the filter 414 protects the CAN-C controller 410 from a CAN-FD frame, this copying of the TX signal to the CAN bus 404 is limited to ensure that unnecessary CAN-C controller 410 outputs do not harm the CAN-FD frame on the bus 404.

Turning again to FIG. 6 the illustrated CAN frames 601, 602, and 603 omit stuff bits. Stuff bits work to avoid triggering error flags that result after transmission of too many consecutive logic 1 or logic 0 bits because having too many consecutive same bits can cause loss of synchronization of the module's clocks on the bus where synchronization is typically done only during a switch from recessive to dominant bits. For example, the CAN-protocol's stuff rule provides that if there are five bits in a row with the same value, zeros or ones, an extra bit is added to the stream of bits with the opposite sign to the previous bit. This extra sixth bit, called the stuff-bit, is added to the CAN-frame by the transmitter. Using the same rule, the receiver knows to remove those stuff bits from the frame before the CAN-frame is presented to software in the MCU. How many such stuff-bits that are contained in a CAN frame depends on how many sequences of ones or zeros there are in the actual CAN frame. If CAN ID and data contain only zeros or ones, every fifth bit is a stuff bit, and at worst case every fourth bit could be a stuff bit. At best there could be a CAN-frame with no or few stuff bits.

In a Standard CAN with a CAN ID having 11 bits, there could be from zero to three stuff bits between SOF and FDF bit. Because the same stuff rule applies for both CAN-C and CAN-FD, the described filter need not address stuff bits in this portion of CAN frames. The stuff rule, however, is applied from the SOF-bit 611, 612 and 613 up to the start of the CRC-part 615 and 617 in the CAN-FD frame and up to CRCD-bit 616 in the CAN-C format.

Although, the filter does not need to store the bits from SOF up to the FDF-bit coming from the CAN bus, it is preferable that the filter do the CRC-calculation for all three formats of CAN frames 601, 602, and 603 to fulfill its role as a CAN-FD module facing the communication path having CAN-FD modules and mimicking a CAN-C frame to the CAN-C controller. For example, even if the frame will turn out to be a CAN-FD frame, the filter preferably starts calculation of the CRC15 checksum because that is needed to be included as a part of the mimic CAN-C frame to avoid triggering an error flag with an incorrect checksum. The start of the CRC15 in the mimic CAN-C frame will include the start of the frame from the SOF bit up to the FDF-bit. The remainder of the CRC15 checksum includes the dominant FDF-bit, the DLC, and any stuff-bits. Typically, there will be at least one stuff-bit because the DLC part will have all bits dominant as well as the dominant RTR, IDE, and FDF bits, creating a sequence of seven dominant bits requiring at least one stuff bit.

Figure 7:
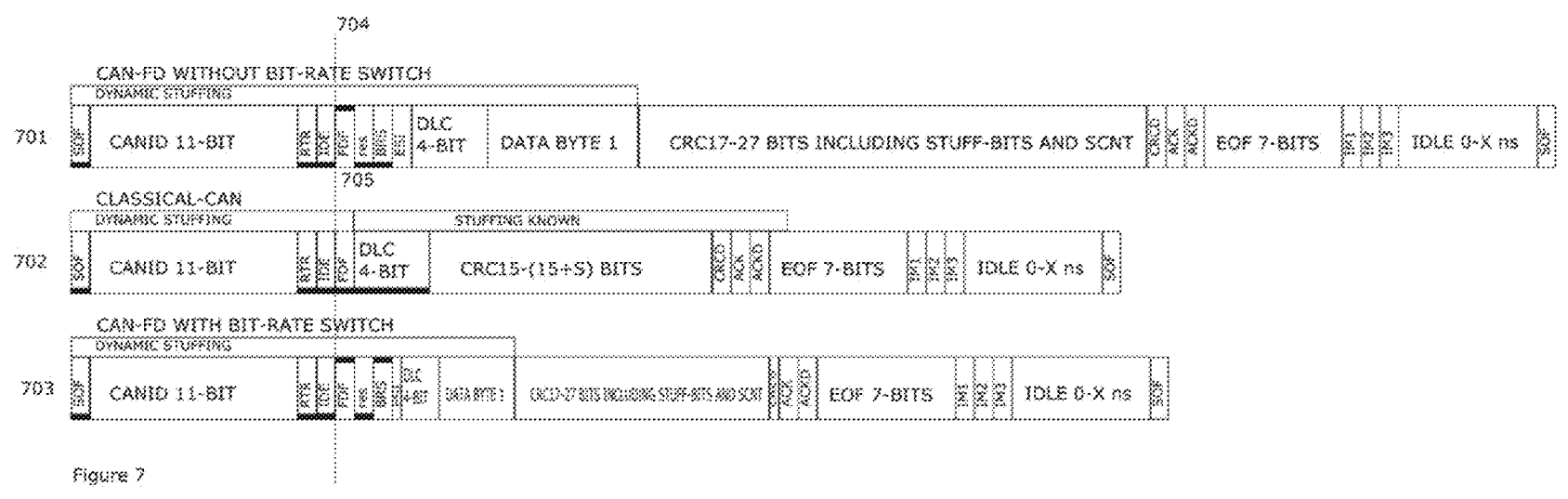

FIG. 7 illustrates the mimic CAN-C frame 702 together with two CAN-FD frames 701 and 703 that could cause creation of such a mimic CAN-frame 702. As described above, all bits up to the FDF-bit at time 704 are identical in all formats. From SOF up to the FDF-bit 705, the filter will be inactive and all bits on the CAN-bus will be copied to the CAN-controller with a minimal delay. According to the CAN-protocol for CAN-C, the FDF-bit should always be sent dominant to indicate that this is a frame according to the format described in the CAN-protocol for CAN-C frames and not a CAN-frame according to a different CAN-protocol indicated by a recessive FDF-bit. Even if this FDF-bit is recessive indicating a different protocol, the CAN-C module will continue to receive the bits following the FDF bit with the assumption that the bits will follow that rules for a CAN-C frame.

To better secure the correct behavior, in one optional approach the filter forces the FDF-bit as dominant from the CAN-bus to the local CAN-C controller because that is the normal for CAN-C frames on a CAN-bus where you mix CAN-C frames with CAN-FD frames. This is the first active action by the filter. If the filter samples the FDF-bit as recessive on the CAN-bus, the filter stops copying bits from the CAN-bus to the local CAN-C controller and the following bits will belong to the mimic CAN-C frame.

As seen in FIGS. 6 and 7, the CAN-C controller expects four bits of DLC immediately after the FDF-bit. These bits are not available from the bus, because the CAN-FD frames have three other bits res 620, BRS 621, and ESI 622 before the DLC 623 for the CAN-FD frame is received. Because every bit of a frame must be presented without any delay to avoid an error frame, the filter sends out the first DLC bit for the mimicked CAN-C frame 702 immediately after the FDF bit. In an example approach, to make the mimic CAN-C frame as short as possible, DLC is forced to zero in the mimic frame. There are several reasons to have no data in the mimic CAN frame. The best would be if the mimic CAN-frame would end exactly where the CAN-FD frame will end. As can be seen in FIGS. 6 and 7, however, the protocol of bits in CAN-FD different compared to CAN-C resulting in a high likelihood of frames with different lengths. If there is no change of the bit-rate will the CAN-FD frame be longer compared to the CAN-C frame. Additionally, CAN-FD frames can contain up 64 bytes of data, making the frame far longer than the CAN-C frames when CAN-FD frames are used without using the bit-rate switch. On the other hand if the bit-rate switch is used, the data part be much shorter. In short, CAN-FD frames can be much longer than a CAN-C frame, if there is no bit-rate switch, and CAN-FD frames utilizing the bit-rate switch can be shorter than a CAN-C frame having no data bytes.

As illustrated in FIG. 7, the DLC-bits in the mimic CAN-C frame are sent before the first DLC-bit in the CAN-FD frame is received. Even if the CAN-FD is sent by a higher bit-rate, at least two bits in the mimic DLC are sent before receipt of any DLC bits from the CAN-FD frame. If the higher data-rate is much higher than the bit-rate used for the arbitration, it could be possible to change the length of the mimic frame by adding more data-bytes to better match the length of the CAN-FD frame. Such processing, however, can be very time-critical and complex. Other methods can be used instead of or in addition to such an approach to match the local end of the CAN-C frames to the end of the CAN-FD frames.

Another reason not to include data-bytes in the mimic frame is that such data must be mimic data. If such data by accident is interpreted as information, it could result in wrong behavior in the unit/units receiving such mimic data creating risk that the mimic CAN-C frame will cause some action. This is, on the other hand, is an ordinary problem in any system when you introduce new CAN frames into the communication link. It is always a risk that some units unintentionally process and react on the newly introduced CAN-frames either it is CAN-FD or CAN-C frames. All future description assumes that the mimic CAN-C frame is sent with DLC set to zero, even though the description that follows will work even if the DLC in the mimic frame is different from zero.

In a further possible aspect, the filter includes sensitivity to error frames on the bus. If any nodes detect an error condition, that node or nodes in most cases place an Error-Frame in the very next bit of the CAN-frame to force a retransmission. Accordingly, it is desirable that the filter handle the error frames according to the CAN-protocol rules. If there is an Error-frame detected on the CAN-bus with the CAN-FD frame, a preferred approach is to have the filter transmit an Error-Frame to the CAN-C at the same time. There is no cost involved to destroy a mimic CAN-frame because it has no value, and normally a CAN-frame killed by an Error-Frame is retransmitted as soon as possible when it has the highest priority access to the CAN-bus. The frame need not retransmit the mimic CAN-C frame because it has no meaning.

Conversely, if the Error-Frame occurs at the CAN-C controller through receipt of the mimic CAN-C frame, such an error-condition likely should not result transmission of the error on the bus resulting in killing the currently transmitted CAN-FD frame. This is because an error generated by the mimic CAN-C frame is highly likely to be irrelevant to the rest of the bus. Accordingly, the preferred default would be to not transfer an Error-condition caused by a mimic CAN-Frame over to a correct working transfer of a CAN-FD frame. It could be possible to have a mode where any Error-condition is passed unconditionally between the two sides. If there is an Error-Frame on either side of the filter, the filter preferably adjusts the Error-frame in the same way the Overload-frames are processed on both sides to secure that the Error/Overload-condition end synchronously at both sides of the filter to secure that that any new CAN frame transmission will start concurrently according to the rules in the CAN-protocol.

Placement of the Overload frames for synchronization purposes will be discussed in more detail with reference to FIG. 8. An Overload-frame has the same format as an Error-Frame. Such a frame will be considered as an Error-frame unless the Error-frame starts in the IM1 (Inter Mission 1) bit 811, in the IM2-bit 812, in the last EOF (End of Frame) bit 814 if the CAN-controller was a receiver of the previous frame. A normal sender would consider a dominant bit in the bit before the IM1-bit (814) as an Error-Frame and will retransmit such frame. Preferably, therefore, the sender of an Overload frame starts the Overload-frame in the IM1-bit 811 so that it is not considered an Error frame. The EOF 815 is seven recessive bits, and the bit before the EOF, the ACKD (Acknowledgement Delimiter) 816 is also recessive. As a result, there are eight recessive bits in front of the IM1-bit 811, which is identical to the Overload Delimiter, which is also eight recessive bits long.

The status of the first bit in the Overload is a switch from recessive to dominant state, which edge is used to adjust the sample-points in the following bits. If the clock-tolerance and the configuration of the CAN-bit in the controller is done according to CAN-protocol rules, it is possible to send any number of Overload-frames one after the other because the next Overload-frame will start in the IM1-bit plus-minus one bit. Because of this arrangement, all units are synchronized at the end of the Overload frame plus-minus one bit at the IM1-bit. The Overload-frame prevents any other unit from starting a CAN-frame transmission on the CAN-bus, and there is a great chance that one or many CAN-units are waiting to start sending such a frame on the communication link because the CAN-bus has been busy during the previous CAN-frame. As described above, clock tolerances can make different units to be either one bit too early or one bit too late compared with the average unit. This could result in a SOF already in the IM3-bit in a unit with a slow clock compared with the clock in the unit that has placed this SOF on the bus. The rules in the CAN-protocol says that you are allowed to use a dominant bit in IM3 as your SOF-bit and all the following CAN-ID bits will be transmitted relative to this first SOF-bit sent by the unit with the fastest clock.

The CAN-protocol rule is that you are only allowed to send two Overload-frames after any data-frame or remote-frame. This is the standard behavior because if you start sending more Overload frames, all communication is delayed thereby reducing the real-time performance of the CAN-system utilizing the CAN-communication. Even if the CAN-protocol limits the number of Overload-frames to two, however, the CAN-system readily handles unlimited number of Overload-frames without generating error frames. There are no rules in the CAN-protocol that define what to do if more than two Overload-frames are detected; thus, CAN modules receiving more than two Overload frames will not react to such a condition. It could be possible to detect that as an error-condition, but no such error-condition is defined in the CAN-protocol, and the only result would be that those units will place an Error-frame at the CAN-bus making the same delay as sending an Overload-frame.

A normal Overload-frame is defined as an Overload-flag followed by an Overload-delimiter. The Overload-delimiter is followed by the three IM1-3-bits. The Overload-flag is six dominant bits, and as soon as any receiving node detects a dominant bit in the IM1-bit or in the two bits surrounding the IM1-bit, they also start sending an Overload-flag consisting of six dominant bits. This will normally result in seven dominant bits followed by the Overload-delimiter. To simplify the rules, the same rules from Error-frames apply to Overload-frames. In a worst case, an Error-flag could be twelve bits long, and to get some margin, all units accept up to 14 dominant bits in Error-flag before generating a second error-condition that will affect error-counters. The units will not send an Error-flag, because that would be useless because the problem is a dominant CAN-bus, and the condition is not improved by sending more dominant bits.

With this knowledge, the CAN-communication can be delayed by placing Overload-frames on the CAN-bus. To achieve synchronization on either side of the described filter, the Overload-frames are placed on both sides of the filter in such way that the IM1-bit occurs at the same position in time on both sides of the filter. The following discussion will provide one example approach to using Overload-frames within the context of mimic frames. Other approaches are possible. For example, the communication can be synchronized by either delaying one or the other side by extending the Overload flag with 0 to 7 bits. In such case it will not be necessary to send more than one Overload frame with 0 to 7 extra bits on one of the two sides. If there sending Overload frames with 14-bits is a problem for a given implementation or if 14-bits is not enough, it is possible to send a sequence of Overload frames with more than 7 bits in the Overload flag. It is also possible to replace an Overload frame with a 14-bit flag with seven Overload frames with 8 bits in the Overload flag. Other combinations are possible. For instance, because a 14-bit long dominant section (Overload frame), which is longer than the expected maximum length caused by an Error-flag (12-bits), the system's clock may need to be more accurate to reliably handle that frame length. If the 14-bit Overload frame is divided into two frames (11- and 10-bits), however, this increased clock demand vanishes. Another approach includes using two frames of 12- and 9-bits, respectively, because ⅝ (75%) of the cases will be solved by using only one Overload frame.

Figure 8:
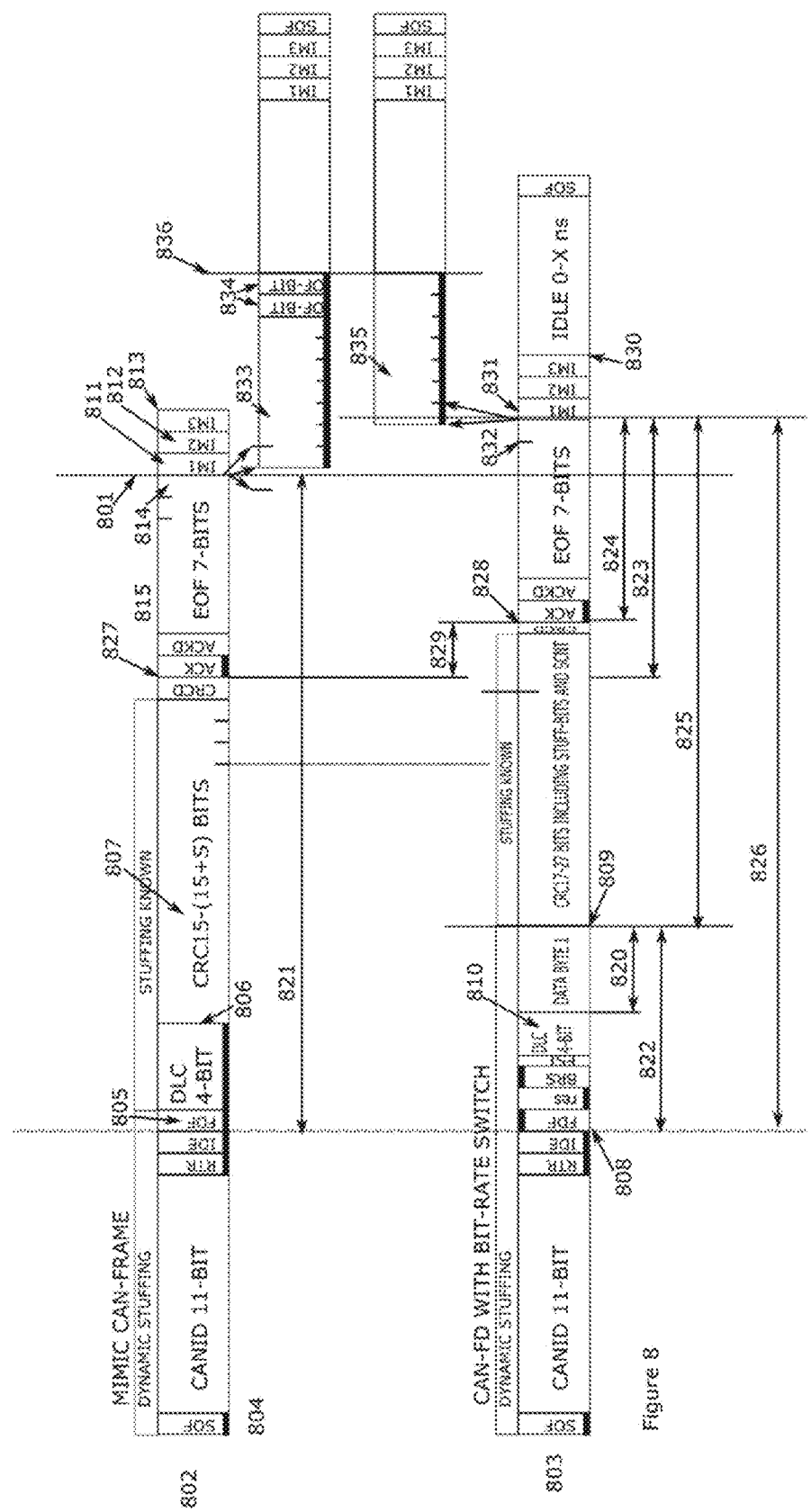
FIG. 8 comprises illustration of example communication frames as configured in accordance with various embodiments of the invention.

The general function is shown in FIG. 8. The mimic frame 802 is relatively simple because this stream of bits is sent by the filter and all the timing is defined by the filter. All bits from the FDF-bit 805 up to the start of the CRC15 806 have fixed values. The CRC15 807 itself is given by the pattern from SOF up to the end of the DLC, and all of them are known when the recessive FDF-bit is received. In other words, it is possible to calculate exactly the number of clock-cycles, indicated by arrow 821, from the start of the FDF-bit up to the start of IM1-bit. To make a match, however, the filter also needs to know the end of the CAN-FD frame that triggered sending the mimicked CAN-C frame.

When the FDF-bit starts at 808, the filter has not yet received the DLC and therefore has no knowledge regarding how many data-bytes will be received before the start of CRC sequence 809. After receiving the DLC 810, the filter can calculate this number of bytes, but the exact number of bits is not known because there could be stuff bits in the data and the number and location of the stuff-bits depends on the data content in the bytes. After the DLC 810 is received, however, it is possible to estimate the number of bits from the end of the DLC up to the start of the CRC indicated by the arrow 820. Even if the filter had exact knowledge of the number of bits from the start of the FDF-bit up to the IM1-bit, indicated by the arrow 826, is this information of marginal value because those bits are produced by some unit connected to the CAN-bus. This unit will likely have a clock with a different pace, and if there is 64-bytes of data sent with a clock having a pace difference of 0.2%, the difference at the end of the frame can be as big as at least one bit. Accordingly, a preferred approach includes the filter continuing to send the mimic CAN-frame and process the CAN-FD frame from the CAN-bus as defined by the CAN-protocol.

Instead, the filter will look for the end of the IM3-bit indicated by 813 for the mimic CAN-C 802 frame and 830 for the CAN-FD frame 803 on the bus. In the illustrated example, the frames 802 and 803 not aligned to end in the same instance in time. In this arrangement, the CAN-C controller can start a CAN-frame after its IM3-bit 813, which bit when placed on the CAN-bus overwrites the IM1-bit 831 or the last bit in the EOF 832 for the CAN-FD frame 803. The first bit in a CAN-frame is SOF and is always dominant thereby overwriting any recessive bit. In this case, it will result in either a dominant bit in the last EOF-bit 832 or in the IM1-bit 831 of the CAN-FD frame 803. In the first case, the result is complex because the CAN-FD sending module will consider this to be a start of an Error-frame and will reactively place an Error-frame on the bus and start retransmitting the previously sent CAN-FD frame. The units on the CAN-bus receiving the CAN-FD frame will consider this as the first bit in an Overload frame and because of that will they all place an Overload frame on the bus. The CAN-C controller will sooner or later detect this Overload/Error frame and also start sending an Error-Frame. After this Error/Overload sending ends, all units will be synchronized and start sending at the same instance in time. In that case the CAN-FD frame arbitrates against the CAN-frame from the CAN-C controller. If the CAN-FD frame wins the arbitration, the whole scenario will be repeated over and over again, and the CAN-FD frame will never be completed.

To avoid this occurrence, the filter preferably secures that the IM3-bit in both the CAN-FD frame and the mimic frame are located at the about the same instance in time. In one approach, this synchronization process is divided in two stages; the first stage makes a rough adjustment within the resolution of one bit, and the second stage adjusts within fractions of a bit.

The rough adjustment starts at the edge of the ACK-bit 827 in the mimic frame and ACK-bit 828 in the CAN-FD frame. The error phase between the CAN-FD frame 803 and the CAN-C frame 802 can be calculated by measuring the time between these edges. In this example, the difference is 2.5 bits. There is not a strict correlation between the arbitration and the data-rate, so the phase difference can be a fraction of a bit. In this case, the data-rate is twice the arbitration rate, and the number of data-bits was not even, resulting in a half bit difference.

In this case, is the mimic frame 802 is two bits ahead of the CAN-FD frame such that the IM-bits should be delayed at least two bits. There is no available mechanism in CAN to delay the IM-bits because they will always be located after the seven EOF bits. The CAN-protocol, however, supports the possibility to replace the IM-bits with an Overload frame as described above. This possibility is used in this solution to adjust the location of the IM-bits. To follow the rules, the Overload-flag starts in the IM1-bit. Instead of sending the recessive IM1-bit to the CAN-C controller, the filter sends a dominant bit indicating an Overload-flag. When the CAN-C controller detects the dominant bit, it sends an Overload flag with six dominant bits. Normally the Overload flag ends here at the seventh bit, but in this case the filter extends the Overload flag by sending two more dominant bits 834 such that the expected bits 811-813 will be replaced by the Overload flag 833 plus the two dominant bits 834 making up an Overload-flag with nine dominant bits.

When the CAN-FD frame reaches the first IM1-bit, the filter acts similarly. It is not possible to allow the three bits IM1 to IM3 from the CAN-FD frame on the bus because after the IM3-bit is it possible for any unit on the CAN-bus to start sending a CAN-frame. This is not optimal because that new frame will collide with the Overload-flag on the other side of the filter with the mimic frame. Thus, the filter sends an Overload-frame on the bus by forcing the CAN-FD frame 803 IM1-bit 831 dominant, thereby creating an Overload-flag 835 on the CAN-bus. In this case the frame need not extend the Overload-flag. When the time 836 occurs, there nothing more to do to synchronize both sides of the filter because all units will start counting the eight bits in the Overload delimiter and the three Inter-Mission bits in synchronization on both sides of the filter. Thus, any module can start sending concurrently in the SOF-bit if they have a CAN-frame.

FIG. 8 illustrates an example of how a filter configured in accordance with this description solves this particular CAN-FD frame. Even if CAN-FD had a relatively fixed format of bytes, a great variation in frame length can occur depending on the number of stuff-bits and bit-rate used in the data-part. CAN-FD can be used with an oscillator having a relatively low tolerance resulting in any number of clock-cycles between the edge in the ACK-bit 827 in the mimic frame and the ACK-bit 829 in the CAN-FD frame.

Figure 9:
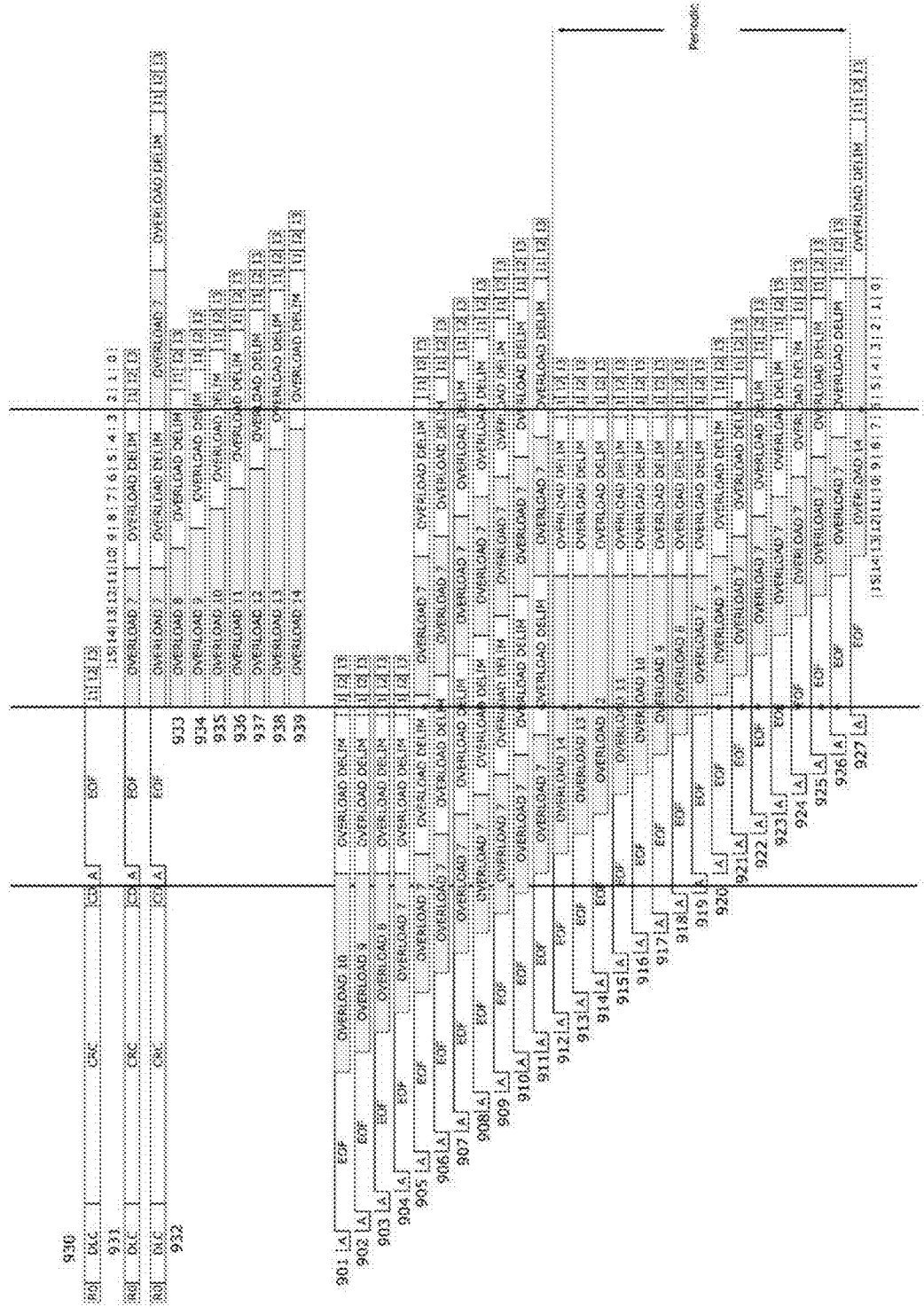
FIG. 9 comprises illustration of example communication frames as configured in accordance with various embodiments of the invention.

FIG. 9 illustrates one approach to achieve this finer synchronization where adjustment is done in increments of arbitration bits. In this example, the frame 930 is the mimic frame without any Overload frame and is the shortest possible frame to mimic. The frame 901 is the shortest CAN-FD possible using a very high bit-rate and no data. This CAN-FD frame's 901 the ACK-bit is already in the DLC of the mimic frame 930. The IM1-bit in the CAN-FD frame 901 is half-way into the CRC-part of the mimic CAN-C frame 930. To delay the next message on the CAN-bus, the filter places an Overload-frame on the CAN-bus. This will result in an Overload-flag from all units connected to the CAN-bus with seven dominant bits. The filter adds three more dominant bits to ensure that the Overload flag ends at the same time as the ACK-bit in the mimic-frame 930. The ACK-delimiter together with the seven bits in the EOF matches the length of the Overload-Delimiter such that all CAN-controllers are in synch at the IM1-bit. Accordingly, the CAN-bus is prepared to handle the next CAN-frame according to the rules in the CAN-protocol.

The next CAN-FD frame 902 is little longer, and the ACK-bit starts one bit later. This case is almost identical to the process to handle the previous CAN-FD frame 901. The only difference is that the Overload-flag will be one dominant bit shorter. The CAN-FD frames 903 and 904 are almost the same as CAN-FD frame 902 with the only difference being that the Overload-flag is respectively eight and seven dominant bits long.

Frame 905 is little more complicated. The previous method does not achieve synchronicity because the Overload-flag cannot be shorter than seven dominant bits. Still an Overload-flag should be placed on the CAN-bus because the mimic frame 930 has not ended yet. Thus, in this example, an Overload-flag is placed on the CAN-bus resulting in seven dominant bits followed by the Overload delimiter with eight bits. This Overload delimiter will end somewhere in the IM1-bit. At this moment, all CAN units are in the receiving state because the pervious CAN-FD frame 905 has finished, and the mimic CAN-frame is sent from the filter. A receiving CAN-controller will accept the Overload frame to start in either the IM1-bit or in the IM2-bit or even in the last bit in the last EOF bit as well as in the last bit in the Overload delimiter. By starting the Overload flag simultaneously on both sides of the filter, both sides of the filter will be in synch, and all CAN-controllers will run in parallel to start the next CAN-frame correctly according to the CAN-rules. The resulting CAN-frames in this case will be CAN-FD frame 905 in combination with frame 931 or possibly frame 933 depending where edges are placed to adjust the phase error less than one CAN-bit.

The next CAN-FD frame 906 is similar to 905. Again, the CAN-FD frame 906 ends too early such that an Overload-flag is preferably sent without any extension as done above with respect to frame 905. Even if this Overload frame is as short as possible, it ends too late to start at the same time as the Overload-flag start after the mimic CAN-frame. Again the location of this edge caused by the first dominant bit defines the location in time for the IM-bits. The filter has full knowledge where the Overload-flag, after the mimic frame, starts; thus, the filter can start the Overload-flag exactly at the bit-edges of the bits in the Overload-flag. In this case, the Overload flag coming after the mimic frame 934 is extended and ends where the seventh Overload-flag frame after the CAN-FD frame 906 ends. This synchronizes the two Overload delimiters even if the edge between the last bit in the Overload-flag and the first bit in the Overload-delimiter is not used for synchronization.

The following frames 907 to 911 are processed by the same rules as frame 906, but because the CAN-FD frame ends even later the filter increases the number of dominant bits in the Overload-flag. The above logic applies as follows: frame 907 matches frame 935, frame 908 matches frame 936, frame 909 matches frame 937, frame 910 matches frame 938, and frame 911 matches frame 939.

When the CAN-FD frame ends later than the ending in the frame 911, the Overload-flag cannot extend any longer because it has already reached 14 dominant bits, which is the maximum number of dominant bits allowed in a CAN-communication. As shown in FIG. 9, however, it is possible to extend the Overload-flag after the CAN-FD frame with seven extra dominant bits, in total 14 bits, to push the Overload-delimiter to be located in the same instance in time as you will get if you have an ordinary Overload-flag with seven dominant bits, like in mimic frame 931. As shown in FIG. 9, the synchronization process applicable to CAN-FD frames 912 to 919 are similar to those applicable to the CAN-FD frames 901 to 904. In this case, the Overload-delimiter after the CAN-FD frame aligns with an Overload-delimiter after the mimic-frame whereas in the CAN-FD frames 901 to 904 the alignment was to an End Of Frame.

The only difference in the CAN-FD frames 912 to 919 is that the Overload flag must be made shorter and shorter to secure that the Overload limiter will be aligned with the Overload frame after the mimic frame 931.

In the same way the CAN-FD frames 905 to 911 can be aligned with mimic frames as shown by frames 933 to 939, CAN-FD frames 920 to 926 can be respectively aligned with 933 to 939. Thus, all possible synchronization solutions are a variation of any of those fifteen solutions. This is because an Overload-frame with 15 bits can never be out of phase more than 15 bits, because it is repeated every 15 bits.

Of note, the filter does break the CAN standard by sending an Overload flag with seven to 14 bits followed by the Overload delimiter. The effect of this rule break, however, is kept hidden inside the bridge. Also, the above approach improves clock synchronization in the system because every overload frame starts with a falling edge thereby providing synchronization of the sampling point to the following bits in the Overload-frame.

The following calculations confirm that the described solution works under the clock tolerance rules that are used in a CAN-communication.

$$df < \frac{SJW_N}{20 \cdot BT_N} \quad \text{Rule I}$$

$$df < \frac{\min(PS1_N, PS2_N)}{2 \cdot (13 \cdot BT_N - PS2_N)} \quad \text{Rule II}$$

$$df < \frac{\min(PS1_N, PS2_N)}{2 \cdot (15 \cdot BT_N - PS2_N)} \quad \text{Changed Rule II}$$

The abbreviations above are well know from different papers describing the CAN-communication, but for clarity a short description included. The bit in CAN is built up by Time Quanta TQ where each such TQ has a certain length in time. The CAN-bit has four elements: Synch segment (SS), Propagation segment (PROP), PhaseSegmemt1 (PS1) and PhaseSegment2 (PS2). Each such segment is built up by a number of TQ. The old CAN-C standard defines the PROP, PS1 and PS2 to have a number of TQ in the range 1 to 8.

TQ—Time Quanta, the basic time element that builds up the length of the CAN-bit. The Bit time is built up by a integer number of TQ.

BT$_N$=(SS+PROP+PS1+PS2)

SS=1*TQ

PROP=[1 . . . 8]*TQ

PS1=[1 . . . 8]*TQ

PS2=[1 . . . 8]*TQ

PS2==PS1

BT$_N$—Bit time for the nominal(arbitration) bit=[44 . . . 25]*TQ

PS—Phase Segment.

df—The tolerance of the clock, a value df=0.01 is a clock tolerance of 1%.

PS1$_N$, PS2$_N$—The two Phase segments in the Nominal bit use in the arbitration.

SJW—Is short for Synch Jump Width, the maximum number of TQ that a CAN-controller can move the sample point in relation to the received recessive to dominant edge. This size must be less or equal to the size of the PS.

Rule I is for bits sent using bit stuffing when a synchronization edge is guaranteed every 10 bit periods.

Rule II is originally for error frames where 6+6 bits is the flag with superposition, and the bit to be sampled is the first recessive bit after an error frame. Because the specification allows longer overload frames to be used and this is taken into advantage in the described solution, the modified rule II is used for a system containing a bridge or filter.

The residual error from the resynchronization has one half bit period added. This results in another consideration. The SOF bit of the next frame must correctly be identified as occurring during either bus idle or in the IM3 bit. If the residual error causes the next SOF to be detected in the IM2 bit, it will be incorrectly interpreted as an overload frame.

Thus, the time from synchronization edge to SOF is14 bits of overload flag, 8 overload delimiter and 3 intermission bits.

Bridge rule:

$2 \cdot df \cdot 25 \cdot BT_N < BT_N + PS2_N$

Add one half bit of error caused by the resynchronization:

$$2 \cdot df \cdot 25 \cdot BT_N < \frac{BT_N}{2} + PS2_N$$

$$df < \frac{1}{100} + \frac{PS2_N}{50 \cdot BT_N}$$

This requirement will always be less than rule I or the changed rule II and therefore has no consequence.

Prove:

$$df < \frac{\min(PS1_N, PS2_N)}{2 \cdot (15 \cdot BT_N - PS2_N)} < \frac{1}{100} + \frac{PS2_N}{50 \cdot BT_N}$$

$$PS2_N = k \cdot BT_N$$

Where "k" is in the range 1/35 and 32/66

Because we want to verify that the new rule is at least larger than the modified rule II, the comparison can be rewritten as:

$$\frac{k \cdot BT_N}{2 \cdot (15 \cdot BT_N - k \cdot BT_N)} < \frac{1}{100} + \frac{k \cdot BT_N}{50 \cdot BT_N}$$

Simplified:

$$\frac{k}{2 \cdot (15 - k)} < \frac{1}{100} + \frac{k}{50}$$

And rewritten:

$0 < 30 - 42 \cdot k - 4 \cdot k^2$

This holds true for all valid "k" values in the range 1/35 to 32/66. This means that getting a half bit synchronization is good enough for timing requirements. All residual timing errors will be handled by hard synchronization in the start of frame bit.

The bridge or filter can be shown to work if the rule II oscillator tolerance requirement is changed and that the whole bus system on the CAN-C only side accepts more than two overload frames in the bridge case or at least the inside CAN-C controller accepts more than two overload frames in the transceiver case.

The propagation time is marginally shortened by the transceiver delay time.

FIG. 9 describes the basic utilization of the Overload frames. This rough adjustment adds dominant bits in the Overload flag on either side of the filter. It is also possible to adjust the phase of the bits with fractions of a bit. It is hard to make a CAN-system to work well if the clocks have less tolerance than 2%. With this clock tolerance is the sample point divide 40% between different units. If the filter also works with such a clock, there will be minimal possibility to make any adjustment at the edge of the ACK-bit. An example is if the clock in the filter is 2% slower than nominal and some other unit has a clock that is 2% faster than nominal. If the CAN-bit used in the CAN-communication in such system is defined to have ten TQ (Time Quanta), the sampling could occur two TQ too early or too late relative to the nominal sample point. The TQ is just a time segment like 100 nano seconds, and if you have ten TQ with that size, the resulting CAN-bit is one micro second long. If the filter has a clock 2% faster than nominal, the edge cannot start earlier because the unit with a clock 2% slower than nominal will have the sample point at the edge resulting in a dominant CRC-delimiter that will cause an Error. If the filter has a clock 2% slower than nominal, the edge cannot start later because the unit with a clock 2% faster than nominal will need a SJW larger than the Phase Segment, which is not allowed according to the CAN-rules. If this filter technology is implemented in a low cost technology where clocks with wider tolerance is to be expected, the fine adjustments will not improve the synchronization at the ACK-bit.

If the filter is equipped with a crystal oscillator with a typical tolerance of 100 ppm (parts per million), some options are available to improve the filter function. With 2%, 20000 ppm, tolerance is it possible to be +/−2 TQ of the nominal location of the nominal edge between the CRC-delimiter and the ACK-bit. With 100 ppm the edge is within 0.01*TQ, which is within the noise jitter, and the filter could be considered to be running at the nominal bit-rate. In such case it is possible to start the ACK-bit two TQ earlier if needed to get the units on the CAN-bus in better synch. Delaying the edge is not preferred because if there is a unit with a clock running 2% slower than nominal, this unit places the edge two TQ earlier. Thus it is not preferred to delay the edge in the ACK-bit, but it is possible to place it as early as possible. Regardless, at the edge of the ACK-bit all units will adjust the CAN-bit to the CAN-unit with the shortest CAN-bits. All units at this point will have the Sample point located correctly located in the bit and will tolerate up to ten CAN-bits in a row without resynchronization and still sample in the correct bit.

This general rule is valid if there is a long sequence without any recessive to dominant edges. In most cases is there a pattern in the CRC-part where you get fewer bits in a row between two edges, and in that case it is possible to force the edges sometimes earlier. This solution is difficult to use on the CAN-FD CAN-bus when using the higher bit-rate. It will be possible to do on the CAN-C because all the CRC-bits are sent by the filter and all the CRC-bits are known already at the first CRC-bit and can be calculated already at the FDF-bit. This makes it possible to adjust the edges within the tolerances of the clocks in use which is indirectly given by the size of the Phase Segments and the SJW.

Another part where it is possible to adjust the phase is in the EOF and in the Overload delimiter. This part is normally just a row with recessive bits sent by the sender. Even if it not suggested or described in the description of the CAN-protocol is it possible to send edges also in the recessive bits. The CAN-controller will accept a bit as recessive as long as the sample point have a recessive value and the rest of the bit can by either dominant or recessive. After the first Recessive bit the AKC-delimiter is it possible to start the next bit dominant and keep it dominant during some TQ. The previous bit was recessive so this edge will be used to adjust the sample point. At the moment is the sample point almost at the correct location in time because only two bits has passed and the maximum change in phase should be 10% of the SJW. If we need a greater change in sample point it is possible to place this edge 90% of the SJW earlier or later to force the receiving units to adjust the sample point to the location of the edge. It is necessary to switch back to recessive before the sample point, because if this bit is not sampled recessive is it considered as an Error-condition by the CAN-controllers. After the bit is sampled recessive it is again possible to make a new edge. In this case was the sample point adjusted at the start of this bit and the maximum change in phase should be 5% of the SJW. By this it is possible to adjust the edge by 95% of the SJW earlier or later to force the receiving units to adjust the sample point to the location of the edge. This possibility is available for all recessive bits in the EOF and in the Overload delimiter. By this tool given by the CAN-protocol is it possible to make a mayor adjustment of the bit edges to adjust that the IM1-bit on the CAN-C will start exactly in the same TQ as on the CAN-bus with CAN-FD frame. The good with this solution is that when you have bad clocks it is possible to make large changes. When you have good clocks will the SJW be smaller but if the clocks are good is it not necessary to make any major changes. This solution will work both when the filter is included in the ECU and when used as a bridge. If used in a bridge it could be little confusing because on a normal CAN-bus will there be no edges in the EOF and in the Overload frame. It could also be a problem if the CAN-bus is very instable where you get a lot of ringing at the edges. This pattern could be considered as a sequence with a bit-pare in each CAN-bit and that will be a signal double frequency compared to the normal worst case frequency for the CAN-bits. This will produce more radiation energy that could be a problem in some systems.

The CAN-FD protocol provides the possibility to have more TQ in the bit. This will make it easier to make small adjustment to the CAN-frames and the CAN-bit in this communication link. It should be possible to adjust this part and optimize this communication to simplify and improve the functionality of the filter in the old ECUs. The ECUs with CAN-FD are still under development and minor adjustment should not be a big issue, compared to make any changes in the software in a reliable and proven older ECU. The conclusion is that better clocks will provide better efficiency in implementation of the solution.

To simplify the description, the above description has so far been based on a filter located between the CAN-driver and the CAN-controller. FIG. 10 shows how the filter can be implemented as a bridge located between two CAN-busses. The connection to the CAN-FD bus 1001 via the CAN-driver 1005 to the filter 1006 is the same. In this implementation is the MCU combined with a CAN-controller replaced by a second CAN-driver 1004 connected to a second CAN-bus 1002 with one or more units not supporting the CAN-FD frame format. This task is little different and little more complex because there are several units involved on both side. In the text this is called a bridge, but it can be considered more like a switch because typically no information is stored and all actions are bit by bit with as little delay as possible due to the circuitry. During the bridging mode all data is transferred between the bridge ports with a small delay incurred by the transceiver circuits.

During arbitration the first port receiving a dominant bit will be the master for the current bit. The bus master will be allowed to drive the value on the other port. The master port will drive a recessive value on its own port to be able to detect a rising edge on the bus. The master will stay master until a rising edge is detected on the master port, then a recovery time counter is started. During the recovery time no port will be able to be bus master. The recovery time should be at least as large as the transmitter to receiver delay loop.

The arbitration with recovery time will insert a recessive period between dominant bits sent alternating from the two sides. A falling edge will be introduced between two dominant bits. The value sampled after the edge will be the same as the last received sample and according to the CAN specification the edge will be ignored. A dominant bit following a recessive bit is immediately transmitted on the other side after the transceiver delay, thus allowing for correct synchronization during arbitration.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Those skilled in the art will further recognize and appreciate that such a processor can comprise a fixed-purpose hard-wired platform or can comprise a partially or wholly programmable platform. All of these architectural options are well known and understood in the art and require no further description here.

Moreover, those skilled in the art will recognize and understand that such an apparatus as those of FIGS. 2-5 and 10 may be comprised of a plurality of physically distinct elements as is suggested by the illustrations. It is also possible, however, to view these illustrations as comprising logical views, in which case one or more of these elements can be enabled and realized via a shared platform. It will also be understood that such a shared platform may comprise a wholly or at least partially programmable platform as are known in the art.

In an additional alternative embodiment, the functionality or logic described may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Accordingly, a computer readable medium (being non-transitory or tangible) may store such instructions that are configured to cause a processing device to perform operations as described herein.

Those skilled in the art will recognize that a wide variety of modifications, alterations, and combinations can be made with respect to the above described embodiments without departing from the scope of the invention. For example, the description describes the case where one ECU with a filter is connected to the CAN-FD CAN-bus. There could be cases where you install two or more ECUs with the filter. Such modifications, alterations, and combinations are to be viewed as being within the ambit of the inventive concept.

What is claimed is:

1. A communication device apparatus for communicating with other devices over a control network using a Controller Area Network (CAN) protocol, the communication device apparatus comprising:
    a communication port configured to connect to a first communication path including at least one communication device compliant with CAN-FD protocol and to a second communication path including at least one communication device compatible with classic CAN protocol but incompatible with the CAN-FD protocol;
    a processing device operatively connected to control receiving and sending communications between the first communication path and the second communication path, the processing device configured to:
        receive a message from the first communication path and retransmit it on the second communication path,
        monitor bits of the message to determine status of an FDF bit of the message,
        in response to determining that the FDF bit indicates a transition to a CAN-FD format, transmit replacement bits on the second communication path to mimic a classic CAN message instead of retransmitting CAN-FD bits from the message following the FDF bit;
    wherein the replacement bits that mimic the classic CAN message are configured to avoid causing a communication device on the second communication path to generate an error flag.

2. The communication device apparatus of claim 1, wherein the processing device is configured to send extra bits on one or both of the first communication path and the second communication path to ensure that the message and the mimicked classic CAN message end at about a same time.

3. The communication device apparatus of claim 2, wherein the processing device is configured to send overload frames as the extra bits.

4. The communication device apparatus of claim 3, wherein the processing device is configured to send the overload frames on the second communication path immediately following the mimicked classic CAN message to effect ending the mimicked classic CAN message in synchronization with the message.

5. The communication device apparatus of claim 3, wherein the processing device is configured to send the overload frames on the first communication path after completion of the message to effect ending the CAN-FD message in synchronization with the mimicked classic CAN message.

6. The communication device apparatus of claim 3, wherein the processing device is configured to send first overload frames on the first communication path after completion of the message and to send second overload frames on the second communication path immediately following the mimicked classic CAN message to effect ending the mimicked classic CAN message in synchronization with the message having the first overload frames.

7. The communication device apparatus of claim 1, wherein the processing device is configured to not send overload frames on either the first communication path or the second communication path if the CAN-FD message and the classic CAN message end in synchronization.

8. The communication device apparatus of claim 1, wherein the apparatus comprises a switch between the first communication path and the second communication path, the switch comprising the processing device.

9. The communication device apparatus of claim 1, wherein the apparatus comprises a CAN driver of a classic CAN communication module, wherein the CAN driver comprises the processing device.

10. The communication device apparatus of claim 1, wherein the processing device is configured to, in response to determining that the FDF bit indicates that the message will be sent in the classic CAN format, continue retransmitting the message on the second communication path.

11. The communication device apparatus of claim 1, wherein the processing device is configured to transmit the replacement bits to mimic the classic CAN message including a DLC portion set to zero.

12. The communication device apparatus of claim 1, wherein the processing device is configured to perform error checking on communications received on the first communication path and on communications sent on the second communication path including the replacement bits and, in response to detecting an error on either the communications received on the first communication path or on communications sent on the second communication path, to issue an error frame on both the first communication path and the second communication path.

13. A method of communication among two or more modules over a common control network using a Controller Area Network (CAN) protocol, the method comprising:
receiving a message from a first communication path including at least one communication device compliant with CAN-FD protocol and retransmitting it on a second communication path including at least one communication device compatible with classic CAN protocol but incompatible with the CAN-FD protocol;
monitoring bits of the message to determine status of an FDF bit of the message,
in response to determining that the FDF bit indicates a transition to a CAN-FD format, transmitting replacement bits on the second communication path to mimic a classic CAN message instead of retransmitting CAN-FD bits from the message following the FDF bit;
wherein the replacement bits that mimic the classic CAN message are configured to avoid causing a communication device on the second communication path to generate an error flag.

14. The method of claim 13 further comprising:
sending extra bits on one or both of the first communication path and the second communication path to ensure that the message and the mimicked classic CAN message end at about a same time.

15. The method of claim 14, wherein the sending extra bits comprises sending overload frames.

16. The method of claim 15, further comprising sending the overload frames on the second communication path immediately following the mimicked classic CAN message to effect ending the mimicked classic CAN message in synchronization with the message.

17. The method of claim 15, further comprising sending the overload frames on the first communication path after completion of the message to effect sending the CAN-FD message in synchronization with the mimicked classic CAN message.

18. The method of claim 15, further comprising sending first overload frames on the first communication path after completion of the message and sending second overload frames on the second communication path immediately following the mimicked classic CAN message to effect ending the mimicked classic CAN message in synchronization with the message having the first overload frames.

19. The method of claim 13, further comprising not sending overload frames on either the first communication path or the second communication path if the CAN-FD message and the classic CAN message end in synchronization.

20. The method claim 13, wherein the receiving the message from the first communication path comprises a switch receiving the message from the first communication path, with the switch installed between the first communication path and the second communication path.

21. The method of claim 13, wherein the receiving the message from the first communication path comprises a CAN driver of a classic CAN communication module receiving the message from the first communication path, wherein the second communication path is a communication path between the CAN driver and the classic CAN communication module.

22. The method of claim 13, further comprising:
in response to determining that the FDF bit indicates that the message will be sent in the classic CAN format, continue retransmitting the message on the second communication path.

23. The method of claim 13, further comprising transmitting the replacement bits to mimic the classic CAN message including a DLC portion set to zero.

24. The method of claim 13, further comprising performing error checking on communications received on the first communication path and on communications sent on the second communication path including the replacement bits and, in response to detecting an error on either the communications received on the first communication path or on communications sent on the second communication path, issuing an error frame on both the first communication path and the second communication path.

25. A communication device apparatus for communicating with other devices over a control network using a Controller Area Network (CAN) protocol, the communication device apparatus comprising:
a processing device operatively connected to control receiving and sending communications between a first communication path including at least one communication device compliant with CAN-FD protocol and to a second communication path including at least one communication device compatible with classic CAN protocol but incompatible with the CAN-FD protocol, the processing device configured to:
receive a message from the first communication path and retransmit it on the second communication path,
monitor bits of the message to determine status of an FDF bit of the message,
in response to determining that the FDF bit indicates a transition to a CAN-FD format, transmit replacement bits on the second communication path to mimic a classic CAN message instead of retransmitting CAN-FD bits from the message following the FDF bit;
wherein the replacement bits that mimic the classic CAN message are configured to avoid causing a communication device on the second communication path to generate an error flag.

26. The communication device apparatus of claim 25, wherein the processing device is configured to send extra bits on one or both of the first communication path and the second communication path to ensure that the message and the mimicked classic CAN message end at about a same time.

27. The communication device apparatus of claim 26, wherein the processing device is configured to send overload frames as the extra bits.

28. The communication device apparatus of claim 27, wherein the processing device is configured to send the overload frames on the second communication path immediately following the mimicked classic CAN message to effect ending the mimicked classic CAN message in synchronization with the message.

29. The communication device apparatus of claim 27, wherein the processing device is configured to send the overload frames on the first communication path after completion of the message to effect ending the CAN-FD message in synchronization with the mimicked classic CAN message.

30. The communication device apparatus of claim 27, wherein the processing device is configured to send first overload frames on the first communication path after completion of the message and to send second overload frames on the second communication path immediately following the mimicked classic CAN message to effect ending the mimicked classic CAN message in synchronization with the message having the first overload frames.

31. The communication device apparatus of claim 25, wherein the processing device is configured to not send overload frames on either the first communication path or the second communication path if the CAN-FD message and the classic CAN message end in synchronization.

32. The communication device apparatus of claim 25, wherein the apparatus comprises a switch between the first communication path and the second communication path, the switch comprising the processing device.

33. The communication device apparatus of claim 25, wherein the apparatus comprises a CAN driver of a classic CAN communication module, wherein the CAN driver comprises the processing device.

34. The communication device apparatus of claim 25, wherein the processing device is configured to, in response to determining that the FDF bit indicates that the message will be sent in the classic CAN format, continue retransmitting the message on the second communication path.

35. The communication device apparatus of claim 25, wherein the processing device is configured to transmit the replacement bits to mimic the classic CAN message including a DLC portion set to zero.

36. The communication device apparatus of claim 25, wherein the processing device is configured to perform error checking on communications received on the first communication path and on communications sent on the second communication path including the replacement bits and, in response to detecting an error on either the communications received on the first communication path or on communications sent on the second communication path, to issue an error frame on both the first communication path and the second communication path.

* * * * *